United States Patent
Smith et al.

(10) Patent No.: US 11,613,652 B2
(45) Date of Patent: Mar. 28, 2023

(54) SILICONE COMPOSITIONS CONTAINING ACRYLATE CURE ACCELERATOR

(71) Applicant: Morgan Adhesives Company, LLC, Stow, OH (US)

(72) Inventors: Timothy M. Smith, Hudson, OH (US); Joseph D. Gorczyca, Cuyahoga Falls, OH (US); Gary A. McMaster, Stow, OH (US); Scott Moeller, Munroe Falls, OH (US)

(73) Assignee: MORGAN ADHESIVES COMPANY, LLC, Stow, OH (US)

( * ) Notice: Subject to any disclaimer, the term of this patent is extended or adjusted under 35 U.S.C. 154(b) by 364 days.

(21) Appl. No.: 16/919,605

(22) Filed: Jul. 2, 2020

(65) Prior Publication Data

US 2021/0002483 A1   Jan. 7, 2021

Related U.S. Application Data

(60) Provisional application No. 62/869,720, filed on Jul. 2, 2019.

(51) Int. Cl.

| | |
|---|---|
| C08G 77/20 | (2006.01) |
| C08L 83/04 | (2006.01) |
| C08K 5/101 | (2006.01) |
| C08K 5/06 | (2006.01) |
| C09J 7/40 | (2018.01) |
| C08G 77/08 | (2006.01) |
| C09J 7/38 | (2018.01) |
| C08F 20/06 | (2006.01) |

(52) U.S. Cl.
CPC .............. *C08L 83/04* (2013.01); *C08G 77/08* (2013.01); *C08G 77/20* (2013.01); *C08K 5/06* (2013.01); *C08K 5/101* (2013.01); *C09J 7/38* (2018.01); *C09J 7/401* (2018.01); *C08F 20/06* (2013.01); *C08G 2170/40* (2013.01); *C08L 2203/16* (2013.01); *C08L 2314/08* (2013.01); *C09J 2483/005* (2013.01)

(58) Field of Classification Search
CPC ................ C08G 771/12; C08G 771/20; C09D 184/04; C08K 5/06; C08K 5/101
See application file for complete search history.

(56) References Cited

U.S. PATENT DOCUMENTS

| | | | |
|---|---|---|---|
| 2011/0147955 A1* | 6/2011 | Kashiwagi | ............ H01L 23/296 257/E23.116 |
| 2015/0344740 A1 | 12/2015 | Griswold et al. | |
| 2021/0222008 A1* | 7/2021 | Ihara | ..................... C08G 77/08 |

FOREIGN PATENT DOCUMENTS

| | | | |
|---|---|---|---|
| CN | 102146277 A | | 8/2011 |
| CN | 105623591 A | | 6/2016 |
| CN | 106459667 A | | 2/2017 |
| EP | 2803710 A1 | | 11/2014 |
| KR | 1020170055552 A | | 5/2017 |
| WO | 8204013 A1 | | 11/1982 |
| WO | 2018085550 A1 | | 5/2018 |
| WO | 20/004254 A1 | | 1/2020 |
| WO | 2020004254 | * | 1/2020 |

OTHER PUBLICATIONS

The Office Action issued in corresponding Chinese Patent Application No. 202080048494.4; dated May 30, 2022.

The International Search Report and Written Opinion issued in corresponding International Application No. PCT/US2020/040632; dated Oct. 23, 2020.

The International Search Report and Written Opinion issued in International Application No. PCT/US2020/040639; dated Oct. 23, 2020.

* cited by examiner

*Primary Examiner* — Kuo Liang Peng
(74) *Attorney, Agent, or Firm* — Pearne & Gordon LLP

(57) ABSTRACT

Compositions are disclosed which include between about 0.05 to about 5 or less wt. % of at least one acrylate monomer based on the total weight of the composition. The acrylate monomer reduces the peak cure temperature, thereby accelerating the rate of cure, without sacrificing completeness of the cure or the release performance of the cured product. The addition of the acrylate monomer also enables a reduction in the amount of costly platinum catalyst required to effectively cure a composition. In addition to the acrylate monomer, the compositions also include a silicone base polymer, a crosslinking agent, and platinum catalyst. The cured compositions exhibit properties useful for incorporation into release liners, adhesive articles, medical products and gaskets.

20 Claims, 5 Drawing Sheets

SILICONE COMPOSITIONS CONTAINING ACRYLATE CURE ACCELERATOR

This application claims the benefit of U.S. provisional application Ser. No. 62/869,720 filed Jul. 2, 2019, the contents of which are incorporated herein in their entirety by reference.

TECHNICAL FIELD

The present disclosure relates to compositions including silicone base polymers and an acrylate cure accelerator, which can be present at about 5 or less wt. % based on the total weight of the composition. The acrylate cure accelerator (e.g., an acrylate monomer) beneficially reduces the peak cure temperature of the composition, thereby accelerating the rate and time of cure, and further reduces the amount of catalyst needed for initiating an effective cure, for example, 90% or more. The present disclosure also relates to the addition of one or more O-vinyl compounds to silicone-containing compositions that are useful for adhesive liners and release products such that the acrylate cure accelerators and O-vinyl compounds synergistically operate to accelerate and enhance the completeness of cure, reduction of peak cure temperature and amount of catalyst needed for initiating an effective cure. The compositions can be used as a material having desirable release properties, for example, release liner coatings, silicone elastomers for medical devices, silicone elastomers for gaskets, and as silicone elastomers for other molded articles.

BACKGROUND

Silicone resins impart elastic, low surface energies, and are therefore desirable for use in the adhesive industry. Notably, silicone-based compositions such as a coating are capable of holding a substrate (e.g., a label) in place for storage and transport, and they also enable simple and quick detachment of a substrate from a release liner. Traditional components of compositions for use as a coating include silicone, crosslinking agents, and catalysts, including, for example, platinum catalysts. However, the high costs associated with using platinum catalysts have prompted the adhesive industry to investigate affordable alternatives. Little success has been achieved in decreasing the amount of platinum catalyst needed to successfully cure compositions containing silicone, for at least the reason that decreasing the amount of platinum catalyst can lead to insufficient curing and/or a slower cure rate.

SUMMARY

Figure 1:
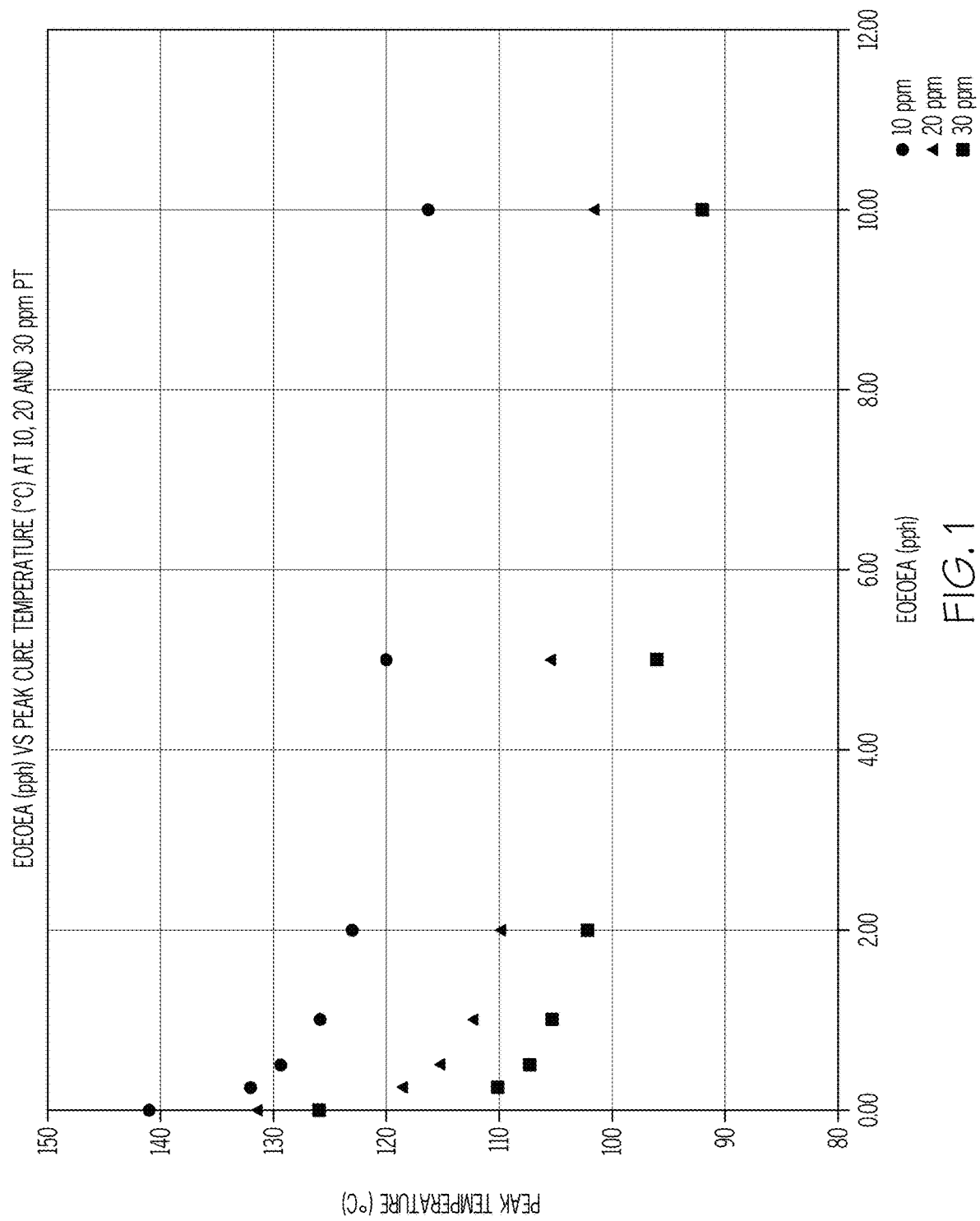
FIG. 1 shows an example relationship between the concentration of the acrylate monomer EOEOEA in parts per hundred (pph) and the peak cure temperature (° C.) for silicone base compositions containing 10 ppm, 20 ppm and 30 parts per million (ppm) of platinum catalyst.

In light of the above, there is a need for a release coating composition that cures quickly without the large amounts of expensive platinum catalyst currently required to initiate and drive the cure of silicone compositions to completion. The present specification describes compositions that cure quickly to completion with reduced amounts of catalyst (e.g., platinum), while also withstanding the rigors of high temperature/high speed processing. The present specification describes silicone-containing compositions containing the conventional amounts of catalyst, but which cure faster at significantly lower temperatures than are currently known in the art. The present specification also describes compositions that may be provided as a coating on liners. The compositions are capable of rapidly curing to form a liner coating that will hold substrates (e.g., labels) in place for storage and transport, while also enabling simple and quick substrate detachment from a release liner. Additionally, the present specification also describes compositions that may be provided on liners and incorporated into adhesive articles, such as label sheets. These compositions solve the problem of reducing the costs associated with the use of expensive catalysts and running ovens at high temperatures, while also accelerating the cure of said compositions without sacrificing the completeness of cure, which might lead to reduced bonding quality, or possible debonding, between the composition and the adhesive on a substrate of the adhesive article.

In a first aspect, disclosed is a composition that includes a silicone base polymer and a cure accelerator that is an acrylate monomer present in the composition from about 0.05 to about 5 weight percent (wt. %) based on the total weight of the composition.

In an example of aspect 1, the silicone base polymer is a vinyl functional silicone base polymer.

In another example of aspect 1, the silicone base polymer is present from between about 50 wt. % to about 95 wt. % of the total weight of the composition.

In another example of aspect 1, the composition is uncured.

In another example of aspect 1, the composition further includes an O-vinyl ether compound, for example, 1,4 cyclohexanedimethanol divinyl ether, butanedioldivinylether (BDVE), and dodecylvinylether (DDVE).

In another example of aspect 1, the O-vinyl ether compound is present from between about 0.01 wt. % to about 10 wt. % of the total weight of the composition.

In another example of aspect 1, the acrylate monomer is selected from the group of a mono-, di-, tri-, or multifunctional acrylate monomer.

In another example of aspect 1, the acrylate monomer is selected from the group of hexanediol diacrylate, tricyclodecanediol diacrylate, isobornyl acrylate, octyl/decyl acrylate, silicone diacrylate, silicone hexaacrylate, Tego RC722, 3-acryloxypropyl trimethoxysilane, and trimethylolpropane triacrylate.

In another example of aspect 1, the acrylate monomer is present from between about 0.05 wt. % to about 2 wt. % of the total weight of the composition or from between about 0.05 wt. % to about 1 wt. % of the total weight of the composition. In another example of aspect 1, the acrylate monomer is present from between about 0.1 wt. % to about 2 wt. % of the total weight of the composition or from between about 0.1 wt. % to about 1 wt. % of the total weight of the composition.

In another example of aspect 1, the acrylate monomer is a hydrophilic acrylate monomer, for instance, an acrylate monomer having a hydrophilic side chain or group containing less than twelve carbons (C12).

In another example of aspect 1, the composition further includes a crosslinking agent having a silicon hydride functional group.

In another example of aspect 1, the composition further includes a controlled release agent (CRA).

In another example of aspect 1, the controlled release agent is present in an amount of about less than 50 wt. % of the total weight of the composition, for example, between about 4 wt. % and about 12 wt. %.

In another example of aspect 1, the composition further includes a catalyst, for example, a catalyst that includes platinum.

In another example of aspect 1, the catalyst is present in the range of between about 10 ppm to about 100 ppm, or 35 ppm or less based on the total weight of the composition.

In a second aspect, the composition of aspect 1 is exposed to a temperature in the range of about 70° C. to about 140° C. for a time period in the range of about 1 second to about 10 seconds such that the composition is cured 90% or more, for example, 95% or more. In another example, the composition of aspect 1 is exposed to a temperature in the range of about 70° C. to about 140° C. for a time period in the range of about 5 seconds to about 40 seconds such that the composition is cured 90% or more, for example, 95% or more.

In an example of aspect 2, the time period for curing the composition is in the range of about 1 second to about 5 seconds, or 5 seconds or less. In another example, the time period for curing the composition is in the range of about 10 seconds to about 40 seconds, or 40 seconds or less.

In another example of aspect 2, the temperature for curing the composition is in the range of about 100° C. to about 130° C.

In another example of aspect 2, the modulus (G') of the composition after curing is $1\times10^6$ Pascals or more measured at a temperature of about 120° C.

In another example of aspect 2, the loss factor (tan δ) of the composition after curing is less than 0.01 measured at a temperature of about 120° C.

In another example of aspect 2, the cured composition is a release material, for example, a coating on a liner, an elastomer for a medical device, or an elastomer for a gasket.

In a third aspect, there is a release liner that includes the cured composition of aspect 1 and a liner that has a first surface and a second surface, wherein the cured composition is disposed as a coating on a portion of the first surface of the liner.

In an example of aspect 3, the liner is selected from the group of a plastic or polymeric film, paper, and coated paper.

In a fourth aspect, there is an adhesive article that includes a substrate, an adhesive disposed on a surface of the substrate, and a release liner having a liner with a first surface and a second surface, a portion of the first surface having the cured composition of aspect 1 disposed thereon and in contact with the adhesive.

In an example of aspect 4, the substrate is a film, paper, or a combination thereof.

In another example of aspect 4, the adhesive is a pressure sensitive adhesive.

In another example of aspect 4, the liner is a plastic or polymeric film, paper or a coated paper.

Any one of the above aspects (or examples of those aspects) may be provided alone or in combination with any one or more of the examples of that aspect discussed above; e.g., the first aspect may be provided alone or in combination with any one or more of the examples of the first aspect discussed above; and the second aspect may be provided alone or in combination with any one or more of the examples of the second aspect discussed above; and so-forth.

Additional features and advantages will be set forth in the detailed description which follows, and in part will be readily apparent to those skilled in the art from that description or recognized by practicing the embodiments as described herein, including the detailed description which follows, the claims, as well as the appended figures.

It is to be understood that both the foregoing general description and the following detailed description are merely exemplary, and are intended to provide an overview or framework to understanding the nature and character of the claims. The accompanying figures are included to provide a further understanding, and are incorporated in and constitute a part of this specification. The figures illustrate one or more embodiments, and together with the description serve to explain principles and operation of the various embodiments.

DETAILED DESCRIPTION

The terminology as set forth herein is for description of the embodiments only and should not be construed as limiting the invention as a whole. Herein, when a range such as 5-25 (or 5 to 25) is given, this means preferably at least or more than 5 and, separately and independently, preferably not more than or less than 25. In an example, such a range defines separately and independently 5 or more, and separately and independently, 25 or less.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, for example within about 5% of each other, or within about 2% of each other.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Provided are compositions containing silicone and incorporating between about 0.05 to about 5 or less wt. % of an acrylate cure accelerator (e.g., acrylate monomer) based on the total weight of the composition. The addition of one or more acrylate cure accelerators in these amounts to compositions including silicone base polymers, catalyst and a cross-linker desirably reduces the peak cure temperature of the composition, thereby accelerating the rate and time of cure. It has also been surprisingly found that the addition of acrylate cure accelerator in these amounts selectively enables a reduction in the amount of catalyst (e.g., a platinum-based catalyst) needed to initiate cure the composition to effective completion without sacrificing the completeness of cure or having detrimental effects on release properties of the cured silicone composition. The compositions provided for herein are especially useful in release liners, particularly for adhesive articles.

Composition Materials

The curable compositions of the present disclosure include one or more silicone base polymers such that the compositions are silicone compositions. The compositions further include one or more acrylate monomers as a cure accelerator, one or more catalysts, and one or more cross-linking agents. Optionally, in some embodiments, the compositions may additionally include one or more O-vinyl compounds and a controlled release agent as described herein.

Generally, the one or more silicone base polymers of the compositions possess reactive vinyl groups. In one or more embodiments, the silicone base polymer is a vinyl functional silicone base polymer or siloxane, for example, a diorganopolysiloxane or a dialkylpolysiloxane. In one example, the silicone base polymer is a multifunctional polymer that has vinyl groups along the polymer chain, and/or vinyl groups at the terminal ends of the chain. In another example, the silicone base polymer can be polydimethylsiloxane (PDMS) or derivative thereof. Vinyl terminated PDMS is an example silicone base polymer. Exemplary silicone base polymers for use in the present disclosure include, but are not limited to, Wacker Dehesive 915 and Dowsil SL161. The total amount of silicone base polymer (e.g., one or more silicone polymers) can be present in a range of from about 50 wt. % to about 95 wt. % or about 60 wt. % to about 90 wt. % of the total weight of the composition. In another example, the composition contains about 50 wt. % or more, about 60 wt. % or more, about 65 wt. % or more, about 70 wt. % or more, or about 75 wt. % or more of total silicone base polymer based on the total weight of the composition, for instance, the uncured composition. In another example, the composition can contain about 95 wt. % or less, about 90 wt. % or less, about 85 wt. % or less or about 80 wt. % or less of the total amount of silicone base polymer.

The acrylate cure accelerators such as acrylate monomers of the compositions function to effectively and beneficially reduce the peak cure temperature of the composition, thereby providing a lower cure temperature needed and accelerating the rate and time of cure. The term "acrylate" herein to define acrylate cure accelerator specifically refers to acrylates, and not to methacrylates, or combinations of acrylates and methacrylates. In certain embodiments, the acrylate cure accelerator is hydrophilic, and includes a hydrophilic side chain or group containing less than twelve carbons (C12). The acrylate cure accelerator may be present in an amount between about 0.05 wt. % to about 5 wt. % based on the total weight of the composition. In another example, the acrylate cure accelerator is present in a range of about 0.1 wt. % to about 5 wt. %, of about 0.15 wt. % or more, about 0.2 wt. % or more or about 0.25 wt. % or more based on the total weight of the composition. In another example, the composition can contain about 4.5 wt. % or less, about 4 wt. % or less, about 3.5 wt. % or less or about 3 wt. % or less of acrylate cure accelerator. In one or more embodiments, the curable composition contains about 5 wt. % or less of total acrylate cure accelerator to ensure a high modulus cured composition is formed. In another example, the composition (e.g., in an uncured state) can include acrylate cure accelerator in a range of about 0.1 to about 10 pph (parts of acrylate cure accelerator per hundred parts of silicone base polymer present in the composition), about 0.2 to about 5 pph, about 0.25 to 5 pph, about 0.2 to about 2 pph, or about 0.5 pph, about 0.75 pph, about 1 pph, about 1.25 pph, about 1.5 pph or about 1.75 pph. In another example, the composition can contain about 10 pph or less, about 5 pph or less, about 4 pph or less, about 3 pph or less or about 2 pph or less of total acrylate cure accelerator. In yet another example, the composition can include up to about 0.1 pph, about 0.2 pph, about 0.25 pph, about 0.5 pph, about 1 pph, about 1.5 pph, about 2 pph, or about 5 pph of total acrylate cure accelerator.

In one or more embodiments, the one or more acrylate cure accelerators are acrylate monomers that are a monofunctional acrylate monomer. In other embodiments, the one or more acrylate monomers are di-, tri-, or multi-functional. Exemplary acrylate monomers for use in the present invention include, but are not limited to, hexane diol diacrylate (HDDA), tricyclodecanediol diacrylate, isobornyl acrylate, octyl/decyl acrylate, silicone diacrylate, silicone hexaacrylate, Tego RC722, 3-acryloxypropyl trimethoxysilane, trimethylolpropane triacrylate (TMPTA), isodecyl acrylate (IDA), propoxylated (3 mol) TMPTA, ethoxylated (3 mol) TMPTA, 2-ethoxyethoxy ethyl acrylate (EOEOEA), propoxylated 2 neopentyl glycol diacrylate (PONPGDA), 2-phenoxyethyl acrylate, ethoxylated (15 mol) TMPTA, polyethylene glycol 200 diacrylate (PEG200DA).

The compositions disclosed herein will also contain a crosslinking agent or crosslinker, for example, a silicon hydride agent. A wide array of crosslinking agents may be used in the disclosed composition, for example, a polyorganohydrosiloxane crosslinking agent as known. Crosslinking agents having silicon hydride functional groups, Si—H groups, are particularly preferred. Exemplary crosslinking agents for use in the present invention include, but are not limited to, V90, available through Wacker Chemical, and Syl-Off 7488, available through Dow Chemical Corporation. The crosslinking agent may be present in a range between about 1 wt. % to about 15 wt. % based on the total weight of the composition. In another example, the cross-linking agent is present in a range of about 2 wt. % to about 14 wt. %, of about 3 wt. % or more, about 4 wt. % or more or about 5 wt. % or more based on the total weight of the composition. In another example, the composition can contain about 14 wt. % or less, about 13 wt. % or less or about 12 wt. % or less of crosslinking agent.

The compositions disclosed herein also include a catalyst, for example, a metal-based catalyst such as platinum or rhodium. A variety of catalysts may be used in the composition. Platinum- (Pt) containing catalysts, such platinum, a platinum complex or platinum compound, are preferred for use in the compositions. In one or more embodiments, the platinum catalyst is Karstedt's catalyst, an organoplatinum compound derived from divinyl-containing disiloxane, which is suitable in hydrosilylation reactions.

Compositions often employ greater than 40 ppm of platinum catalysts. Less than 40 ppm of platinum catalyst can undesirably lead to an incomplete curing and compromised bonding with adhesive-coated substrates when compositions are used in a release application. However, in preferred embodiments of the compositions disclosed herein, the catalyst is present in an amount of between about 5 ppm to about 100 ppm, about 10 ppm to about 80 ppm, or about 15 ppm to about 60 ppm of the total weight of the composition. In some embodiments, the catalyst (e.g., a platinum-based catalyst) constitutes about 40 ppm or less, about 35 ppm or less, about 30 ppm or less, about 25 ppm or less or about 20 ppm or less of the total weight of the composition. In one or more embodiments, the amount of platinum catalyst may be within a range of about 1 ppm to about 20 ppm of the total weight of the composition. In other embodiments, the amount of platinum catalyst may be within a range of about 5 ppm to about 10 ppm of the total weight of the composition.

In one or more embodiments of the compositions, the compositions also optionally include an O-vinyl compound. A wide array of O-vinyl compounds may be used in the composition. For example, O-vinyl ether compounds may be used. In one or more embodiments, the O-vinyl ether compound is selected from 1,4 cyclohexanedimethanol divinyl ether, butanedioldivinylether (BDVE), and dodecylvinylether (DDVE). The O-vinyl compound may be present in a range between about 0.01 or 0.05 wt. % to about 5 or less wt. % or about 0.1 wt. % to about 3 wt. % based on the total weight of the composition. In one or more embodiments, the O-vinyl compound is present at about 2.5 wt. % or less, about 2 wt. % or less, about 1 wt. % or less or about 0.5 wt. % or less of the total weight of the composition.

In another embodiment of the composition, the composition also includes a controlled release agent (CRA). When added to the composition, controlled release agents function to adjust the binding strength of the composition, for example, when used as an adhesive article. In one or more embodiments, controlled release agents include silicone resins comprising monovalent (M) siloxane groups ($R_3SiO_{1/2}$ groups), wherein R is a monovalent hydrocarbon group that is typically methyl or vinyl, and tetravalent (Q) siloxane groups ($SiO_{4/2}$ groups) only, otherwise known as MQ resins. The vinyl groups allow the CRA to react with the silicone polymer during cure. In one or more embodiments, the controlled release agent may be CRA 17 available from Wacker or SL 40 supplied by Dow Chemical. The controlled release agent may be present in an amount less than 50 wt. % of the total weight of the composition. In other embodiments, the controlled release agent may be present in a range between about 1 wt. % to about 35 or less wt. %, about 2 wt. % to about 25 or less wt. %, or about 4 wt. % to about 12 or less wt. % based on the total weight of the composition.

Exemplary compositions in accordance with the present disclosure are set forth in Table 1 below:

TABLE 1

| Exemplary Composition Materials | |
|---|---|
| Component | Amount (wt. %) |
| Silicone Base Polymer(s) | 50-95 |
| Catalyst(s) | As Noted |
| Crosslinking Agent(s) | 4-12 |
| Acrylate Cure Accelerator(s) | 0.05-5 |
| O-Vinyl Ether(s) | As Noted |
| Controlled Release Agent(s) | As Noted |

Preparation of the Composition

The following is an exemplary method of preparing a composition. The silicone base polymer, crosslinking agent, catalyst and, optionally, the controlled release agent are added together, and the components are mixed together, for example, for about 5 to about 25 minutes or until thoroughly mixed, to prepare a mixture. The acrylate cure accelerator and, optionally, the O-vinyl ether compound are added to the mixture and further mixed (e.g., for about 5 to about 25 minutes) to form a reactive mixture. In one or more embodiments, the step of adding the acrylate cure accelerator, and optionally the O-vinyl ether compound, to the components of the mixture in the method of preparing a curable (e.g., heat curable) composition is performed immediately before application to a curing condition, for example, heating the composition.

In one or more embodiments, the silicone base polymer and crosslinker can be combined together and mixed until a uniform blend is achieved before adding an optional controlled release agent. The blend is further mixed or agitated until uniform. A catalyst is further added, for instance in the form of a solution, such as a platinum-containing solution, and mixed to form a mixture. The acrylate cure accelerator and, optionally, the O-vinyl ether compound are added to the mixture and further mixed (e.g., for about 5 to about 25 minutes) to form a reactive mixture. The reactive mixture is subjected to a curing condition, for example, heating the composition. Heating can be achieved by any suitable means, for example, in an oven.

Curing conditions for the composition can include exposing the composition to heat. In an example, the composition is heated in an oven or series of ovens to initiate curing. The ovens can be pre-heated at a range of about 130° C. to about 150° C. in order to effectuate curing. However, it has been found that the compositions disclosed herein can be cured about 90% or more or about 95% or more when the compositions are heated at a range of about 70° C. to about 140° C., about 75° C. to about 130° C., or about 80° C. to about 120° C. In one or more embodiments, the coating compositions can be cured at about 90% or more or about 95% or more when the compositions are heated at a range of about 70° C. to about 120° C., about 75° C. to about 115° C., or about 80° C. to about 110° C. In other embodiments, the compositions can be cured about 90% or more or about 95% or more at higher temperatures, for example, at a range of about 120° C. to about 180° C., about 125° C. to about 170° C., or about 130° C. to about 160° C., or at about 140° C. or 150° C.

As evidenced in the Examples below, the use of the acrylate cure accelerator can reduce the peak cure temperature of the compositions, for example, at a range of about 70° C. to about 140° C., about 75° C. to about 135° C., about 80° C. to about 130° C. or about 90° C., about 100° C., about 110° C., or about 120° C. Curing conditions, such as the exposure temperature for the compositions, can be adjusted accordingly. For instance, oven temperatures can be set below typical cure temperatures with the use of the acrylate cure accelerators. The Examples also exhibit the cure temperature for achieving a cure of 95% or more, for example, at a range of about 70° C. to about 140° C., about 75° C. to about 135° C., about 80° C. to about 130° C. or about 90° C., about 100° C., about 110° C., or about 120° C.

The compositions also benefit from use of the acrylate cure accelerators in that the amount of time, for example dwell time in heated conditions such as an oven, to achieve effective cure (e.g., 90% or 95% or more) is reduced. In one or more embodiments, the compositions can be cured for a time period of about 1 second to about 1 minute, about 2 seconds to about 45 seconds, about 3 seconds to about 30 seconds, about 25 seconds or less, about 20 seconds or less, about 15 seconds or less, about 10 seconds or less, about 8 seconds or less, or about 5 seconds or less at a temperature in the range of about 70° C. to about 130° C., about 75° C. to about 125° C., or about 80° C. to about 120° C. In other embodiments, higher cure temperatures can be used with the same cure time periods as above, for instance, at a range of about 120° C. to about 180° C., about 125° C. to about 170° C., or about 130° C. to about 160° C., or at about 140° C. or 150° C. Curing time periods for curing the composition can be in the range of 10 seconds to 40 seconds or more in examples when both the composition is to be cured and simultaneously drying adhesive material of an adhesive article as described herein. In one or more embodiments, the composition can be applied as an uncured coating on a first surface of a liner substrate of a release liner. The release liner with the composition coating can be positioned on a substrate (e.g., a label that may be made of a polymeric film, paper, or combinations thereof) that is at least partially covered with a thin layer of an adhesive that may be pressure sensitive. The composition coating of the release liner can be in direct contact with the adhesive on the substrate such that the adhesive layer is disposed between the substrate and the coating composition on the liner material of the release liner. The article can be heated, for example in an oven at conditions described above, to both cure the composition of the release liner and dry the adhesive on the substrate, for instance, by exposing the article for a time period of about 10 seconds to about 40 seconds or 1 minute at a temperature in the range of about 70° C. to about 130° C., about 75° C. to about 125° C., or about 80° C. to about 120° C.

Release Liners

The present disclosure also provides for the use of applying the composition to coat a flexible liner that can be used to form a release liner. The release liner functions as a carrier for, and which protects, a substrate (e.g., label). The composition disclosed herein is typically applied as a very thin release layer or coating (e.g., about 1 µm, micron) to the surface of the flexible liner. The thickness of the release layer of the composition can be in the range of about 0.05 to about 3 µm, about 0.1 to about 2 µm, about 0.25 to about 1 µm, or about 0.5, about 0.75, about 1, about 1.5 or about 2 µm. Applying a release layer of the composition to a surface of a liner provides for an elastic and low-energy layer that holds a label in place on the surface of a liner during storage, and also provides for quick and simple removal.

In some embodiments, the flexible liner for coating with the composition may be a polymeric film, a paper material, and/or a coated paper material. A variety of materials can be used for the flexible liner including, but not limited to, conventional smooth surface paper materials, polyester and polyolefin films. In certain embodiments, the flexible liner coated with the composition (i.e. release liner) is of adequate thickness to strengthen a backing sheet. In a preferred embodiment, the release liner possesses enough rigidity and/or thickness to maintain a flat configuration, while also having enough flexibility to bend in response to an external stimulus.

In order to prevent the silicone polymer from transferring to an adhesive and interfering with the adhesion of an adhesive article, such as a label, the composition coated on the flexible liner must be crosslinked through a process known as curing. Uncured silicone in the composition is undesirable because it may interfere with printing and other label processing steps.

Once the composition for coating a flexible liner is prepared, as disclosed above, it is applied to the flexible liner using a series of rollers. The rollers mash and form the composition reactive mixture into a thin layer at thicknesses noted above onto the flexible liner. The coated release liner is then heated, for example, in an oven or series of ovens to initiate curing of the reactive mixture. Typically, the ovens are heated at a range of about 130° C. to about 150° C. in order to effectuate curing. However, it has been found that the release liner coating composition disclosed herein can be cured about 90% or more or about 95% or more when the ovens are also heated at temperatures below 130° C., for instance, at a range of about 70° C. to about 130° C., about 75° C. to about 125° C., or about 80° C. to about 120° C. In one or more embodiments, the compositions coated on a flexible liner can be cured at about 90% or more or about 95% or more when the compositions are heated at a range of about 70° C. to about 120° C., about 75° C. to about 115° C., or about 80° C. to about 110° C.

In one example, the coated flexible liner is moved through the ovens at approximately 2,000 feet per minute, such that the time exposed to elevated temperatures at which curing occurs is between about 1 second to about 5 or 10 seconds. In some embodiments, the time at which curing occurs is in the range of 1 to 5 seconds, or about 2, 3 or 4 seconds. During curing, the vinyl groups of the silicone react with the silicon hydride groups of the crosslinking agent through a process called hydrosilylation. The resulting product is a highly crosslinked, three dimensional polymer. The curing process does not produce any volatile byproducts. Little or no post-curing occurs once the liner exits the ovens and is returned to room temperature. In one or more embodiments, the compositions can be cured for a time period of about 1 second to about 30 seconds, about 2 seconds to about 25 seconds, about 20 seconds or less, about 15 seconds or less, about 10 seconds or less or about 5 seconds or less at a temperature in the range of about 70° C. to about 140° C., about 75° C. to about 130° C., or about 80° C. to about 120° C.

The hydrosilylation that occurs during silicone cure is an exothermic process that produces an exothermic peak, which is measured using differential scanning calorimetry (DSC). DSC is an industry-recognized method of analyzing the difference in the amount of heat required to increase the temperature of a sample compared to a reference, and is measured as a function of temperature. Typically, the temperature is increased at 10° C. per minute. Heat flow is typically measured in watts.

Several measurements of the exothermic peak provide information regarding the overall cure. Peak temperature, generally measured in degrees Celsius (° C.), is the temperature where the exothermic peak reaches its maximum. Peak area, generally measured in Joules per gram (J/g), measures the total exotherm and is a measure of the completeness of the cure. Generally, a greater peak area figure indicates a more complete the cure. Peak width, generally measured in degrees Celsius (° C.), measures the speed at which cure occurs. Peak height, generally measured in Watts per gram (W/g), indicates the degree (intensity) of cure. A narrow and high exothermic peak indicates a fast, intense cure, while a short and wide exothermic peak indicates a slow, gradual cure of the silicone composition. The temperature at which 95% of the silicone polymer is cured is also measured, typically in degrees Celsius (° C.).

Unlike the DSC results, a rheometer can reveal the physical properties of a material as the temperature is increased during curing. Typically, the elastic shear modulus (G') is measured. The first derivative of the elastic modulus shows how fast the reaction is increasing. The temperature where the first derivative is at its greatest is a measure of the maximum reaction rate, which is approximately equivalent to the peak cure temperature obtained via DSC. The first derivative maximum, typically measured in Pascals per degree Celsius (Pa/° C.), shows the maximum rate of crosslinking and the temperature of the maximum shows the temperature where the maximum rate occurs. The second derivative of the modulus curve indicates how the rate of reaction is changing. The second derivative minimum temperature, generally measured in degrees Celsius (° C.) is the temperature at which the cure is nearly complete. The G' at the second derivative minimum temperature, measured in Pascals (Pa), demonstrates the point at which the reaction has slowed to almost near completion.

Adhesive Articles

The present disclosure also provides for adhesive articles comprising a substrate, an adhesive applied on the substrate, and a release liner, the surface of which is layered with a cured composition. The composition can be applied as a solution on a substrate or liner material for forming a release liner, in which the coated solution is then cured by applying heat as disclosed herein to complete formation of the release liner. The present disclosure includes examples of a method for supplying the composition as a release layer onto the base material (e.g., a paper liner) of a release liner such as various conventional methods, for instance, a gravure coating method, a bar coating method, a spray coating method, a spin coating method, a knife coating method, a roll coating method, a die coating method, and the like. In some embodiments, the substrate is a label that may be made of a polymeric film, paper, or combinations thereof. The substrate is at least partially covered with a thin layer of an adhesive that may be pressure sensitive. The adhesive layer is disposed between the substrate and the cured release layer of the composition.

The adhesive layer may be formed from any suitable adhesive material as desired for a particular purpose or intended use. The adhesive layer may comprise pressure sensitive adhesive layer, or a heat activated adhesive layer. The pressure sensitive adhesive can be any pressure sensitive adhesive now known in the art, for example, an acrylic adhesive, a vinyl ether adhesive, a polyester adhesive, a polyurethane adhesive, a rubber adhesive, a silicone adhesive, and the like or any combination thereof. In other examples, the adhesive may be any of emulsion type, solvent type, and non-solvent type, and may be either crosslinking type or non-crosslinking type. The pressure sensitive adhesive materials that are useful may contain as a major constituent adhesive polymers including, for example, acrylic type polymers, block copolymers, natural rubber, reclaimed rubber or styrene butadiene rubbers, tackified natural or synthetic rubbers, random copolymers of ethylene and vinyl acetate, ethylene-vinyl-acrylic terpolymers, and polyisobutylene, poly(vinyl ether). Typically, pressure sensitive adhesive materials are typically characterized by glass transition temperatures in the range of about −70° C. to about 10° C.

In addition to the foregoing, additional components may be incorporated into the pressure sensitive adhesive materials. These additional components include, for example, solid tackifying resins, liquid tackifiers (e.g., plasticizers), antioxidants, fillers, pigments, waxes, etc. or a blend thereof. Particularly useful adhesives are described in U.S. Pat. Nos. 5,192,612 and 5,346,766.

The adhesive layer may have a thickness as desired for a particular purpose or intended use. In one embodiment, the adhesive layer may have a thickness from about 10 to about 125, or from about 10 to about 75, or from about 10 to about 50 microns. In one embodiment, the coat weight of the pressure sensitive adhesive may be in the range of about 10 to about 50 grams per square meter (gsm), and in one embodiment about 20 to about 35 gsm.

Assembly of the adhesive layer is not limited, and may be any appropriate assembly or configuration as needed for a particular purpose or intended use. In one embodiment, for example, the adhesive layer may comprise a single layer, two layers, or multiple layers. In one embodiment, the adhesive layer(s) may also be substantially continuous. In another embodiment, the adhesive layer(s) may be provided as a discontinuous layer or layers.

It will be apparent to those skilled in the art that various modifications and variations can be made to the disclosed embodiments without departing from the spirit and scope of the disclosure. Thus, it is intended that the present disclosure cover any and all such modifications and variations as come within the scope of the appended claims and their equivalents.

Examples

In order to exhibit the effects of specific additives on compositions, a cure study was performed with compositions prepared according to Table 2.

TABLE 2

| 20 ppm Pt catalyst, 10% CRA Silicone Base Composition using Short Chain Linear Polymer ||
| --- | --- |
| Component | Wt. % |
| DEH 915 | 81.71 |
| CRA 17 | 9.28 |
| V 90 | 7.15 |
| HSPC | 1.86 |

Dehesive 915 (DEH 915), the silicone base polymer, is a short-chain, linear, di-functional, vinyl-terminated silicone polymer provided by Wacker Chemicals, was used for the silicone base polymer. A silicone release modifier resin (e.g., a controlled release agent), CRA 17, was added to show the compatibility between the tested additives and the other components in the release coating compositions. V90, a silicone crosslinker provided by Wacker Chemical, and 20 ppm of HSPC (20 ppm of platinum atomic mass), a platinum catalyst diluted in silicone polymer, were also added to the silicone base composition.

1 pph of various additives, including acrylate cure accelerators and O-vinyl compounds, set forth below in Table 3, were added to the composition mixture identified in Table 2 to form a reactive mixture for curing. The reactive compositions were cured at in a DSC at a ramp of 10° C./min as previously described and the peak temperatures, peak heights, peak widths, peak areas, and temperatures at 95% cure of the release coating composition were measured via DSC as previously described. The results obtained are also included in Table 3.

that acrylate monomers directly contributed to cure acceleration with the presence of a low amount of catalyst (20 ppm). In contrast, it is also observed in Table 3 that N-vinyl compounds, vinyl compounds, and methacrylates did not beneficially change peak cure temperature, and in certain instances, raised cure temperatures.

Additionally, wider and shorter exothermic peak heights were observed for the acrylate monomer-containing compositions as compared to the additive-free control composition. The slightly wider and shorter peaks showed that while acrylates reduced the peak cure temperature, they made the cure slightly more sluggish at the reduced temperature. However, while O-vinyl ethers did not reduce the peak cure temperature, they increased the reaction rate, as indicated by the greater peak heights while maintaining narrow peak areas.

In order to explore the effects of additives on compositions having higher concentrations of platinum catalyst, the

TABLE 3

Curing Study of 1 pph Additive and 20 ppm Pt catalyst, 10% CRA Silicone Base Composition in DSC

| Additive | Peak Temp (° C.) | Peak Height (W/g) | Peak Width (° C.) | Peak Area (J/g) | Temp (° C.) 95% Cure | ΔT (T95% − Peak T) |
|---|---|---|---|---|---|---|
| Control (No Additive) | 127.8 | 2.377 | 2.51 | 43.96 | 134.5 | 6.61 |
| N-Vinyl Compounds | | | | | | |
| N-Vinyl-Pyrrolidone (NVP) | 150.3 | 0.1479 | 28.06 | 22.76 | 170 | 19.63 |
| N-Vinyl-Caprolactam (NVC) | 162.3 | 0.3987 | 8.55 | 35.45 | 168.6 | 6.24 |
| O-Vinyl Compounds | | | | | | |
| 1,4 Cyclohexanedimethanol Divinyl Ether | 128.0 | 2.688 | 2.79 | 49.74 | 133.7 | 5.68 |
| Butanedioldivinylether | 129.0 | 3.277 | 2.79 | 57.66 | 133.8 | 4.75 |
| dodecylvinylether | 129.5 | 3.315 | 2.47 | 53.24 | 134.6 | 5.03 |
| Methacrylates | | | | | | |
| Isobornyl Methacrylate | 126.5 | 1.933 | 2.88 | 40.84 | 133.1 | 6.56 |
| 1,10-Decamethylene Glycol Dimethacrylate | 127.2 | 1.992 | 2.98 | 43.97 | 134.3 | 7.09 |
| Isodecyl Methacrylate | 129.0 | 2.028 | 2.79 | 42.41 | 135.9 | 6.94 |
| Methacryloxypropyl Trimethoxysilane | 128.7 | 1.286 | 2.43 | 21.45 | 133.1 | 4.45 |
| Acrylates | | | | | | |
| Hexane Diol Diacrylate (HDDA) | 115.4 | 1.768 | 3.54 | 47.5 | 123.1 | 7.7 |
| Tricyclodecanediol Diacrylate (Ebecryl 130) | 119.1 | 1.899 | 3.13 | 45.02 | 125.8 | 6.61 |
| Isobornyl Acrylate (IBOA) | 116.3 | 2.052 | 2.92 | 43.3 | 122 | 5.68 |
| Octyl/Decyl Acrylate (ODA-N) | 115 | 2.086 | 2.97 | 44.96 | 120.5 | 5.5 |
| Silicone Diacrylate (Ebecryl 350) | 120.7 | 2.031 | 2.66 | 40.84 | 127.3 | 6.58 |
| Silicone Hexaacrylate (Ebecryl 1360) | 118.7 | 1.725 | 2.89 | 37.71 | 124.5 | 5.72 |
| Tego RC722 - Silicone Acrylate | 112.9 | 1.527 | 3.55 | 40.02 | 119.6 | 6.68 |
| 3-Aeryloxypropyl Trimethoxysilane | 114.2 | 2.057 | 3.03 | 44.63 | 119.7 | 5.48 |
| TMPTA | 117.7 | 1.855 | 3.73 | 57.51 | 125.4 | 7.68 |
| Isodecyl Acrylate (IDA) | 115.1 | 1.49 | 3.08 | 43.71 | 122.9 | 7.83 |
| Propoxylated (3 mol) TMPTA | 113.1 | 1.776 | 3.27 | 48.86 | 120.8 | 7.67 |
| Vinyl | | | | | | |
| Vinyltrimethoxysilane | 130.1 | 1.951 | 2.51 | 38.04 | 136.3 | 6.11 |
| Allyltrymethoxysilane | 124.8 | 2.624 | 2.5 | 46.8 | 132.9 | 8.06 |

From Table 3, it can be readily observed that the peak cure temperature for acrylate monomer-containing compositions decreased by approximately 7 to 15 degrees Celsius as compared to the additive-free control composition. Acrylate monomer-containing compositions also reduced the peak cure temperature more than the other compounds tested. Because the acrylate monomer-containing compositions significantly lowered the peak temperature, it can be concluded experiment laid out in Table 3 was reproduced using the compositions according to Table 4. The same components were used for the composition as in Table 2. However, the amount of vinyl-terminated base polymer was reduced, and the amount of platinum was increased to 60 ppm. The amounts of silicone crosslinker and release modifier resin were kept approximately the same.

TABLE 4

60 ppm Pt, 10% CRA Silicone Base Composition
using Wacker Short Chain Linear Polymer

| Component | Wt. % |
|---|---|
| DEH 915 | 78.04 |
| CRA 17 | 9.29 |
| V 90 | 7.1 |
| HSPC | 5.57 |

Less amount of additive was added to the compositions for this study. Specifically, 0.5 pph of various types of additives, including acrylate monomers and O-vinyl compounds as set forth below in Table 5, were added to the compositions to form reactive mixtures. The compositions were cured, and the peak temperatures, peak heights, peak widths, peak areas, and temperatures at 95% cure of the composition were measured via DSC as previously described. The results are listed in Table 5.

TABLE 5

Curing Study of 0.5 pph Additive, 60 ppm Pt,
10% CRA Silicone Base Composition in DSC

| Additive | Peak Temp (° C.) | Peak Height (W/g) | Peak Width (° C.) | Peak Area (J/g) | Temp (° C.) 95% Cure | ΔT (T95% − Peak T) |
|---|---|---|---|---|---|---|
| Control (No Additive) | 111.4 | 2.05 | 2.62 | 40.47 | 118.3 | 6.88 |
| O-Vinyl Compounds | | | | | | |
| 1,4 Cyclohexanedimethanol Divinyl Ether | 110.6 | 2.261 | 2.69 | 44.84 | 117.4 | 6.81 |
| Butanediodivinylether | 108.8 | 3.313 | 2.64 | 56.04 | 112.8 | 4 |
| Dodecylvinylether | 109.8 | 3.554 | 2.42 | 54.63 | 113.5 | 3.68 |
| Acrylates | | | | | | |
| Hexane Diol Diacrylate (HDDA) | 95.0 | 1.58 | 3.04 | 44.01 | 100.9 | 5.94 |
| Octyl/Decyl Acrylate (ODA-N) | 97.1 | 1.848 | 2.99 | 43.19 | 104.3 | 7.15 |
| Silicone Diacrylate (Ebecryl 350) | 103.0 | 1.82 | 2.71 | 38.82 | 109.7 | 6.68 |
| Tego RC722 - Silicone Acrylate Anchorage | 93.1 | 1.776 | 2.81 | 40.57 | 99.8 | 6.64 |
| 3-Aeryloxypropyl Trimethoxysilane | 94.8 | 1.981 | 2.68 | 41.83 | 101.5 | 6.71 |
| TMPTA | 93.6 | 1.447 | 3.84 | 54.53 | 100.7 | 7.14 |
| Ethoxylated (3 mol) TMPTA | 94.1 | 1.375 | 3.34 | 42.39 | 102.1 | 7.99 |
| Propoxylated (3 mol) TMPTA | 95.6 | 1.733 | 3.12 | 43.6 | 102.3 | 6.72 |
| 2-Ethoxyethoxy Ethyl Acrlyate (EOEOEA) | 90.5 | 2.446 | 2.71 | 58.33 | 92.4 | 1.84 |
| Propoxylated 2 neopentyl glycol diacrylate (PONPGDA) | 91.2 | 2.711 | 3.08 | 56.68 | 92.9 | 1.62 |
| 2-Phenoxyethyl Acrylate | 91.3 | 2.819 | 2.76 | 58.35 | 92.7 | 1.39 |
| Ethoxylated (15 mol) TMPTA | 98.6 | 2.479 | 2.73 | 49.56 | 102.1 | 3.58 |
| Polyethlyene Glycol 200 Diacrylate (PEG200DA) | 88.6 | 2.491 | 2.98 | 54.69 | 93.7 | 5.1 |
| Stearyl Acrylate | 93.9 | 1.976 | 2.55 | 47.33 | 97.8 | 3.91 |

It can be readily observed from Table 5 that the acrylate monomer-containing compositions exhibited a significant decrease in peak cure temperature (e.g., approximately 8.4 to 22.9 degrees Celsius lower) as compared to the additive-free control composition. As compared to the 20 ppm platinum catalyst acrylate-containing compositions studied in Table 3, the 60 ppm platinum catalyst acrylate monomer-containing compositions showed an even more dramatic increase in peak cure temperature. Similarly, it can be seen that while O-vinyl compounds only reduced the peak cure temperature 0.9 to 2.7 degrees Celsius, they increased the peak heights while maintaining narrow peak widths. Thus, the O-vinyl compounds increasing the intensity of the cure. Thus, it can be seen that acrylates and O-vinyl ethers affect the cure in independent, but complementary ways.

Regarding peak area, the acrylate-containing compositions generally exhibited larger peak area values than the additive-free control composition, although the degree varied based on the type of acrylate monomer used. Likewise, the O-vinyl compounds tested consistently exhibited larger peak areas and peak heights than both the acrylate monomer-containing compositions and the additive-free control composition. Accordingly, it can be concluded that the inclusion of acrylate monomers and O-vinyl compounds can result in a greater portion of the compositions to being cured (e.g., cure enhancement). Nevertheless, the results in Table 3 and Table 5 demonstrate that the cure acceleration and enhancement generated by acrylate monomers and O-vinyl compounds occurred across a range of platinum catalyst concentrations (20 to 60 ppm) and additive amounts (0.5 to 1 pph). Thus, low amounts of cure accelerator and low amounts of catalyst can be utilized while still achieving effective cure.

In order to show that cure acceleration and cure enhancement were not limited to the silicone base composition components used in the previous studies, the experiment was repeated with compositions containing different silicone polymers, crosslinkers, and controlled release agents as described in Table 6. Furthermore, the compositions included a low amount of catalyst ~35 ppm of platinum catalyst, as opposed to the 20 ppm and 60 ppm concentrations tested in previous studies.

TABLE 6

35 ppm Pt, 10% CRA Silicone Base Composition
using Dow multifunctional polymer

| Component | Wt. % |
|---|---|
| SL 161 | 81.82 |

TABLE 6-continued 35 ppm Pt, 10% CRA Silicone Base Composition using Dow multifunctional polymer

| Component | Wt. % |
|---|---|
| SL 40 | 9.44 |
| 7488 | 5.59 |
| SL 3000 | 3.16 |

SL 161, a vinyl-terminated, multifunctional silicone polymer containing vinyl groups along the polymer chain and provided by Dow Chemical, was used for the silicone base polymer. SL 40, a silicone release modifier resin (e.g., controlled release agent), was added to show the compatibility between the tested additives and the other components in the release coating compositions. 7488, a silicone crosslinker provided by Wacker Chemical, and 35 ppm of SL 3000, a platinum catalyst, were also added to the silicone base composition.

0.5 pph of various additives, as described in Table 7, were added to the silicone base composition. The compositions were cured, and the peak temperatures, peak heights, peak widths, peak areas, and temperatures at 95% cure of the composition were measured via DSC as previously described. The results are included in Table 7.

catalyst used in the silicone base coating composition. It can be further concluded in comparing the results of Tables 3, 5 and 7 that the acrylate monomer will accelerate the cure independent of the amount of platinum catalyst present in the silicone base composition.

In contrast to the additive-free control compositions, shorter and wider peaks were observed in the acrylate monomer-containing compositions. Both the acrylate monomer-containing and O-vinyl compound-containing compositions exhibited increased peak areas when compared to the additive-free control composition, indicating that a greater portion of those silicone base compositions were cured (e.g., cure enhancement). However, the O-vinyl compounds, which generally had the larger peak heights, proved to be the most effective cure enhancers. In view of these results, it is evident that the cure-enhancing properties of the O-vinyl compounds and acrylate monomers are independent of the particular amounts and types of silicone polymer, crosslinker, controlled release agent, and platinum catalyst used in the silicone base coating composition.

To further demonstrate the cure accelerating and enhancing abilities of acrylate monomers across silicone compositions containing varying levels of platinum catalyst, silicone base compositions according to Table 8 were prepared. SL 161 was used as the silicone base polymer and 7488 was

TABLE 7

Curing Study of 0.5 pph Additive, 35 ppm Pt, 10% CRA Silicone Base Composition in DSC

| Additive | Peak Temp (° C.) | Peak Height (W/g) | Peak Width (° C.) | Peak Area (J/g) | Temp (° C.) 95% Cure | ΔT (T95% − Peak T) |
|---|---|---|---|---|---|---|
| Control (No Additive) | 122.7 | 2.004 | 2.87 | 42.39 | 129.0 | 6.31 |
| O-Vinyl Compounds | | | | | | |
| 1,4 Cyclohexanedimethanol Divinyl Ether | 121.7 | 2.038 | 3.09 | 46.78 | 129.8 | 8.06 |
| Butanediodivinylether | 120.5 | 2.094 | 2.88 | 57.79 | 139.3 | 18.87 |
| dodecylvinylether | 122.2 | 2.082 | 2.75 | 50.73 | 134.6 | 12.4 |
| Meth-Acrylates | | | | | | |
| Steryl Methacrylate | 119.8 | 2.66 | 2.52 | 49.64 | 125.9 | 6.07 |
| Acrylates | | | | | | |
| Hexane Diol Diacrylate (HDDA) | 105.7 | 1.505 | 3.96 | 48.38 | 115.6 | 9.99 |
| Isobornyl Acrylate (IBOA) | 110.7 | 1.32 | 3.36 | 44.69 | 123.9 | 13.11 |
| Octyl/Decyl Acrylate (ODA-N) | 107.7 | 1.319 | 3.24 | 43.22 | 115.1 | 7.36 |
| Silicone Hexaacrylate (Ebecryl 1360) | 111.9 | 1.725 | 3.24 | 44.6 | 118.7 | 6.85 |
| Tego RC722 - Silicone Acrylate Anchorage | 104.0 | 1.778 | 3.4 | 46.54 | 111.3 | 7.27 |
| 3-Aeryloxypropyl Trimethoxysilane | 104.7 | 1.842 | 3.39 | 48.13 | 112.6 | 7.88 |
| TMPTA | 110.2 | 1.714 | 3.92 | 52.23 | 116.4 | 6.2 |
| Isodecyl Acrylate (IDA) | 107.1 | 1.366 | 3.41 | 46.67 | 119.7 | 12.54 |
| Ethoxylated (3 mol) TMPTA | 105.5 | 1.495 | 3.72 | 47.33 | 116.4 | 10.91 |
| Propoxylated (3 mol) TMPTA | 106.9 | 1.643 | 3.71 | 48.85 | 116.8 | 9.89 |
| 2-Ethoxyethoxy Ethyl Acrlyate (EOEOEA) | 102.4 | 1.539 | 3.07 | 49.14 | 106.5 | 4.01 |
| Propoxylated 2 neopentyl glycol diacrylate (PONPGDA) | 104.0 | 1.381 | 3.64 | 45.47 | 110.7 | 6.72 |
| 2-Phenoxyethyl Acrylate | 102.7 | 1.487 | 2.81 | 41.19 | 107.3 | 4.59 |
| Ethoxylated (15 mol) TMPTA | 108.9 | 1.477 | 2.72 | 40.25 | 112.5 | 3.54 |
| Polyethlyene Glycol 200 Diacrylate (PEG200DA) | 99.8 | 1.65 | 3.39 | 44.7 | 106.8 | 6.98 |
| Stearyl Acrylate | 108.1 | 1.918 | 3.09 | 46.4 | 113.6 | 5.49 |

From Table 7, it is evident that the acrylate-containing compositions exhibited significantly lower peak cure temperatures as compared to the additive-free control composition. The O-vinyl compounds did not have a significant impact on the peak cure temperature. Accordingly, it can be concluded that the acrylate monomer's ability to accelerate the cure is independent of the particular types of silicone polymer, crosslinker, controlled release agent, and platinum used as the silicone crosslinker. No controlled release agent was added to these compositions. SL 3000, a platinum catalyst, was added to the compositions in amounts of 10, 20, 30 and 35 ppm, respectively, as set forth below.

TABLE 8

0% CRA Silicone Base Composition using Dow multifunctional polymer

| Component | 10 ppm Formula Wt. % | 20 ppm Formula Wt. % | 30 ppm Formula Wt. % | 35 ppm Formula Wt. % |
|---|---|---|---|---|
| SL 161 | 94.20 | 94.2 | 94.2 | 91.8 |
| 7488 | 4.94 | 4.94 | 4.94 | 4.9 |
| SL 3000 | 0.91 | 1.83 | 2.75 | 3.3 |

2-Ethoxyethoxy Ethyl Acrylate (EOEOEA), an acrylate monomer, was used as the additive and added on top of the 10 ppm, 20 ppm, and 30 ppm silicone base compositions in amounts of 0.25, 0.5, 1, 2, 5, and 10 pph, respectively. Upon the addition of EOEOEA, the compositions were cured, and the peak temperatures, peak heights, peak widths, peak areas, and temperatures at 95% cure were measured via DSC as previously described. The results are set forth below in Table 9.

TABLE 9

Curing Study Varying Pt and Additive (EOEOEA) Levels

| EOEOEA (pph) | ppm Pt | Peak Temp (° C.) | Peak Height (W/g) | Peak Width (° C.) | Peak Area (J/g) | Temp (° C.) 95% Cure | ΔT (T95% − Peak T) |
|---|---|---|---|---|---|---|---|
| 0.00 (control) | 10 | 141.0 | 1.79 | 2.56 | 35.48 | 146.6 | 5.6 |
| 0.25 | 10 | 132.1 | 1.555 | 2.87 | 36.34 | 138.2 | 6.09 |
| 0.5 | 10 | 129.4 | 1.036 | 3.22 | 36.18 | 136.7 | 7.25 |
| 1 | 10 | 125.9 | 0.9237 | 4.24 | 36.53 | 134.0 | 8.11 |
| 2 | 10 | 123.1 | 0.7773 | 5.22 | 35.31 | 132.5 | 9.41 |
| 5 | 10 | 120.1 | 0.6839 | 5.54 | 36.53 | 135.0 | 14.93 |
| 10 | 10 | 116.3 | 0.7641 | 5.6 | 39.67 | 134.5 | 18.18 |
| 0 (control) | 20 | 131.5 | 1.979 | 2.35 | 36.69 | 136.9 | 5.35 |
| 0.25 | 20 | 118.6 | 1.122 | 2.91 | 32.09 | 124.4 | 5.79 |
| 0.5 | 20 | 115.2 | 1.008 | 3.22 | 35.09 | 121.7 | 6.49 |
| 1 | 20 | 112.4 | 0.752 | 4.03 | 36.77 | 119.4 | 7.02 |
| 2 | 20 | 110.0 | 0.8458 | 5.47 | 41.71 | 112.5 | 2.5 |
| 5 | 20 | 105.5 | 0.7668 | 5.31 | 41.92 | 121.6 | 16.03 |
| 10 | 20 | 101.7 | 0.651 | 6.85 | 41.29 | 119.9 | 18.15 |
| 0 (control) | 30 | 126.0 | 2.096 | 2.29 | 36.81 | 130.5 | 4.51 |
| 0.25 | 30 | 110.1 | 1.102 | 2.82 | 34.08 | 115.4 | 5.31 |
| 0.5 | 30 | 107.3 | 1.181 | 3.37 | 36.69 | 114.6 | 7.24 |
| 1 | 30 | 105.3 | 1.075 | 4.3 | 41.65 | 115.4 | 10.15 |
| 2 | 30 | 102.2 | 0.8317 | 5.91 | 42.64 | 114.1 | 11.91 |
| 5 | 30 | 96.0 | 0.8392 | 5.23 | 49.97 | 120.2 | 24.22 |
| 10 | 30 | 91.9 | 0.6329 | 7.45 | 49.39 | 113.8 | 21.88 |

As is evident from Table 9, the EOEOEA-containing compositions at each platinum concentration exhibited a substantial decrease in peak cure temperature, and experienced an accelerated cure. Perhaps more significantly, the amount of acrylate monomer required to achieve the most pronounced cure acceleration can be determined from Table 9. As shown in FIG. 1, the steepest reduction in peak cure temperature occurred when between about 0.25 and about 2 pph of EOEOEA were added to the base composition across the various platinum-containing concentrations. While the addition of acrylate monomer in amounts greater than about 2 pph also resulted in decreased peak temperature, the reduction was not as pronounced. Thus, it can be concluded that the most pronounced cure acceleration is observed when about 2 pph or less of acrylate monomer is added to a silicone base composition prior to cure, and irrespective of the composition's platinum concentration as evidenced by the Examples.

Figure 2:
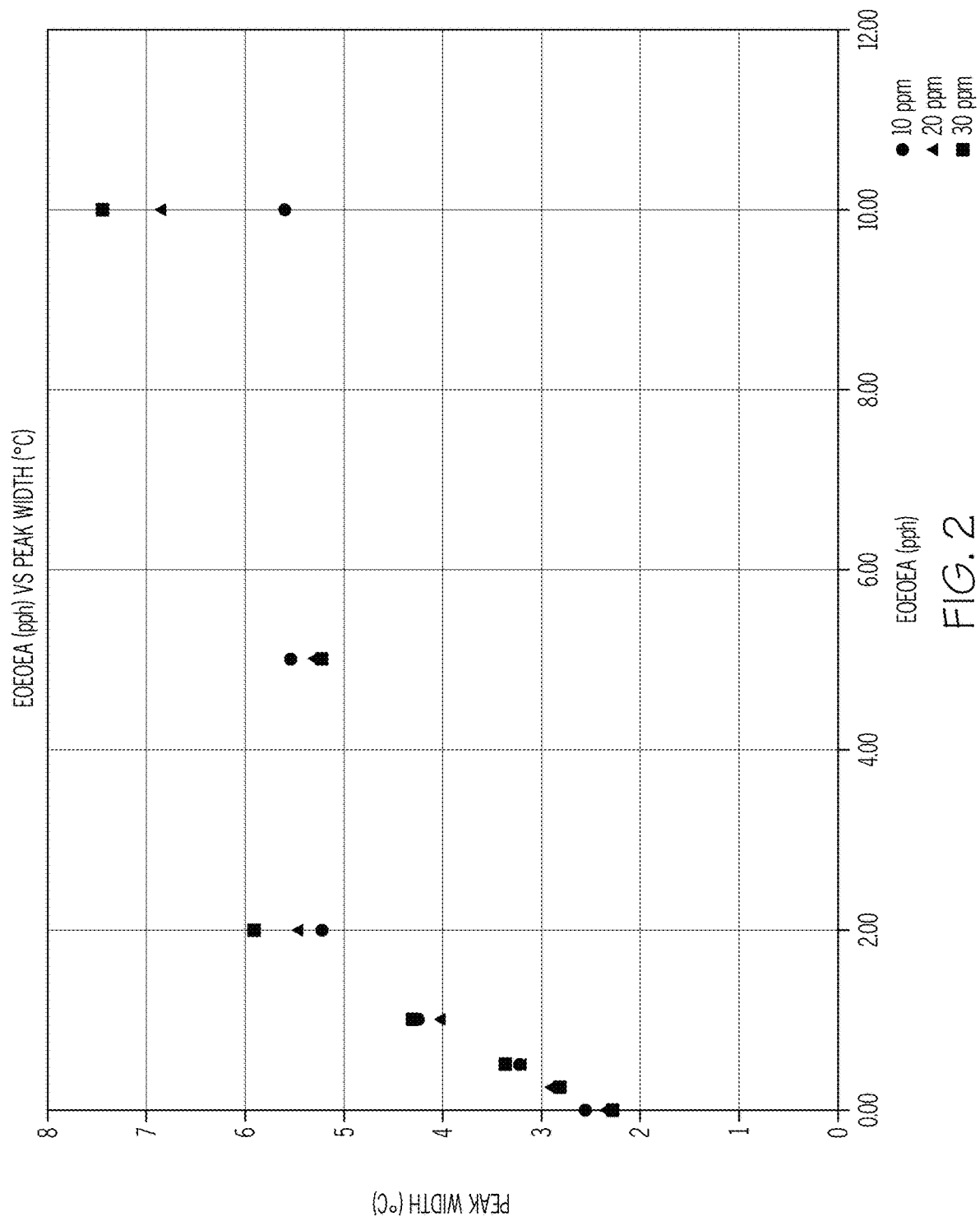
FIG. 2. shows an example relationship between the concentration of the acrylate monomer EOEOEA in parts per hundred (pph) and the peak width in degrees Celsius (° C.) for silicone base compositions containing 10 ppm, 20 ppm and 30 ppm of platinum catalyst.

Similarly, as shown in FIG. 2, the peak width drastically increased when between about 0.25 and about 2 pph EOEOEA was added to the various platinum-containing compositions. However, the change in peak width generally remained constant when between about 2 and about 10 pph EOEOEA was added to the compositions. Accordingly, FIG. 2 also demonstrates that the most pronounced cure acceleration occurs when about 2 pph or less of acrylate monomer is added to the silicone base compositions, irrespective of the composition's platinum concentration.

In order to demonstrate that about 2 pph or less of acrylate monomer produces the most pronounced cure acceleration across a range of acrylate monomers and platinum catalyst concentrations, additional acrylate monomers were studied in various amounts in silicone base compositions containing higher concentrations of platinum catalyst. Two acrylate monomers, Octyl/Decyl Acrylate (ODA) and Tego RC722-Silicone Acrylate Anchorage (Tego RC722), were added to the 35 ppm silicone base composition set forth above in Table 8. The acrylate monomers were added in amounts of 0.1, 0.2, 0.5, 1, 2, 5, and 10 pph, respectively, on top of the silicone base composition. Upon the addition of the acrylate monomers, the compositions were cured as previously described and the peak temperatures, peak heights, peak widths, peak areas, and temperatures at 95% cure were measured via DSC. The results are set forth below in Tables 10 and 11, respectively.

TABLE 10

Curing Study Varying Additive Level Using ODA and 35 ppm Pt Catalyst-containing Silicone Base Composition

| ODA (pph) | Peak Temp (° C.) | Peak Height (W/g) | Peak Width (° C.) | Peak Area (J/g) | Temp (° C.) 95% Cure | ΔT (T95% – Peak T) |
|---|---|---|---|---|---|---|
| 0 (control) | 122.7 | 2.004 | 2.87 | 42.39 | 129.0 | 6.31 |
| 0.1 | 113.6 | 2.173 | 2.86 | 50.98 | 120.4 | 6.8 |
| 0.2 | 110 | 2.214 | 2.87 | 48.95 | 116.3 | 6.37 |
| 0.5 | 106.7 | 2.458 | 3.13 | 59.05 | 114.7 | 7.95 |
| 1 | 105.6 | 2.184 | 3.53 | 58.58 | 114.7 | 9.04 |
| 2 | 103.2 | 1.253 | 4.69 | 53.46 | 134.7 | 31.48 |
| 5 | 103.0 | 1.413 | 4.98 | 67.28 | 126.9 | 23.95 |
| 10 | 104.3 | 1.212 | 5.96 | 70.12 | 139.1 | 34.87 |

TABLE 11

Curing Study Varying Additive Level Using Tego RC722 and 35 ppm Pt Catalyst-containing Silicone Base Composition

| Tego (pph) | Peak Temp (° C.) | Peak Height (W/g) | Peak Width (° C.) | Peak Area (J/g) | Temp (° C.) 95% Cure | ΔT (T95% – Peak T) |
|---|---|---|---|---|---|---|
| 0 (control) | 140.8 | 2.783 | 2.71 | 56.15 | 145.3 | 4.5 |
| 0.1 | 140.6 | 1.425 | 2.9 | 41.86 | 146.0 | 5.45 |
| 0.2 | 130.9 | 2.234 | 3 | 51.33 | 137.7 | 6.82 |
| 0.5 | 128.5 | 1.304 | 3.34 | 42.54 | 135.7 | 7.23 |
| 1 | 130.0 | 1.16 | 3.41 | 42.35 | 138.4 | 8.35 |
| 2 | 126.2 | 0.9962 | 3.88 | 44.61 | 135.1 | 8.96 |
| 5 | 126.9 | 0.9172 | 6.78 | 51.61 | 144.1 | 17.22 |
| 10 | 130.3 | 0.4899 | 12.06 | 47.18 | 153.7 | 23.38 |

Figure 3:
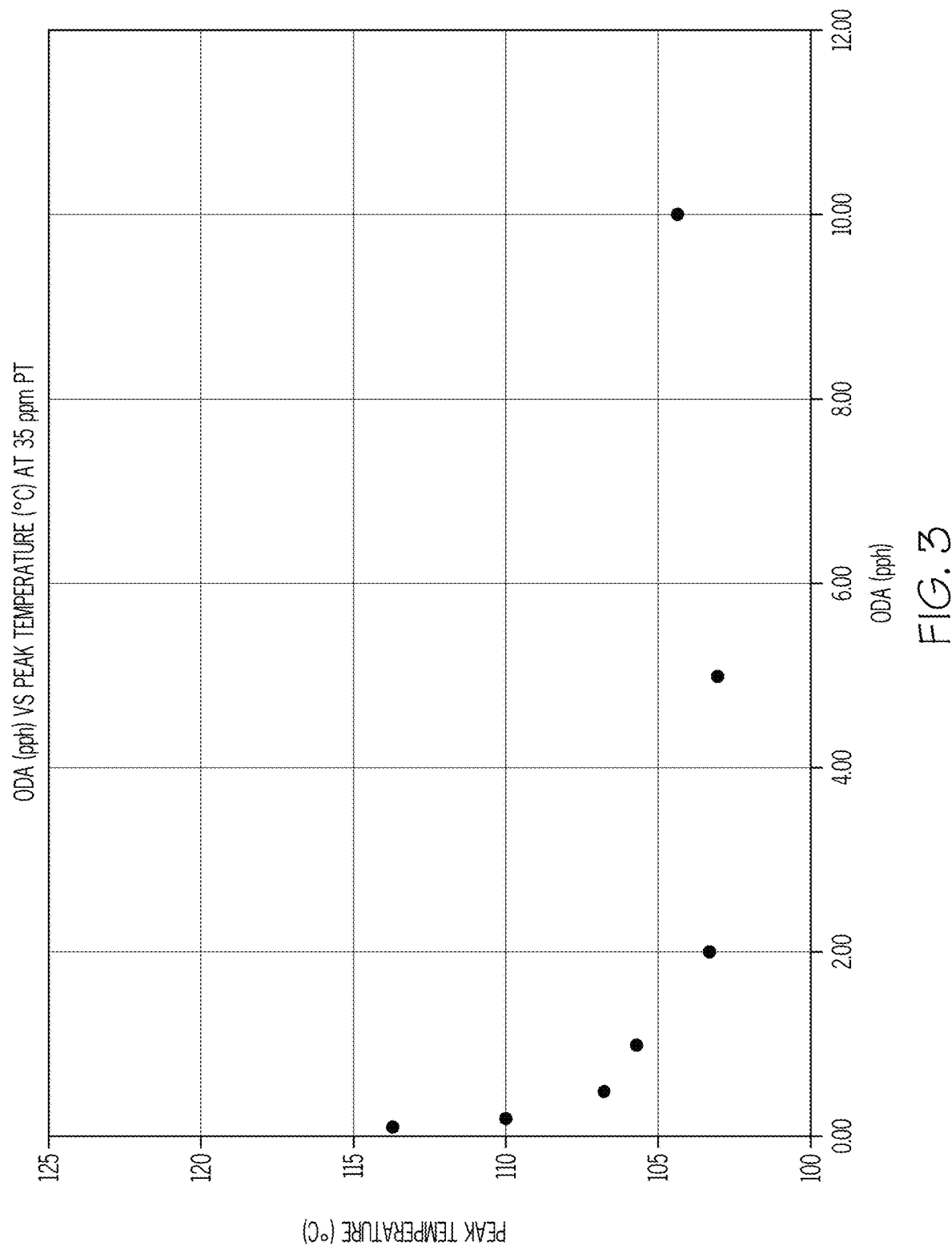
FIG. 3 shows an example relationship between the concentration of the acrylate monomer ODA in parts per hundred (pph) and the peak cure temperature in degrees Celsius (° C.) for a silicone base composition containing 35 parts per million (ppm) of platinum catalyst.
Figure 4:
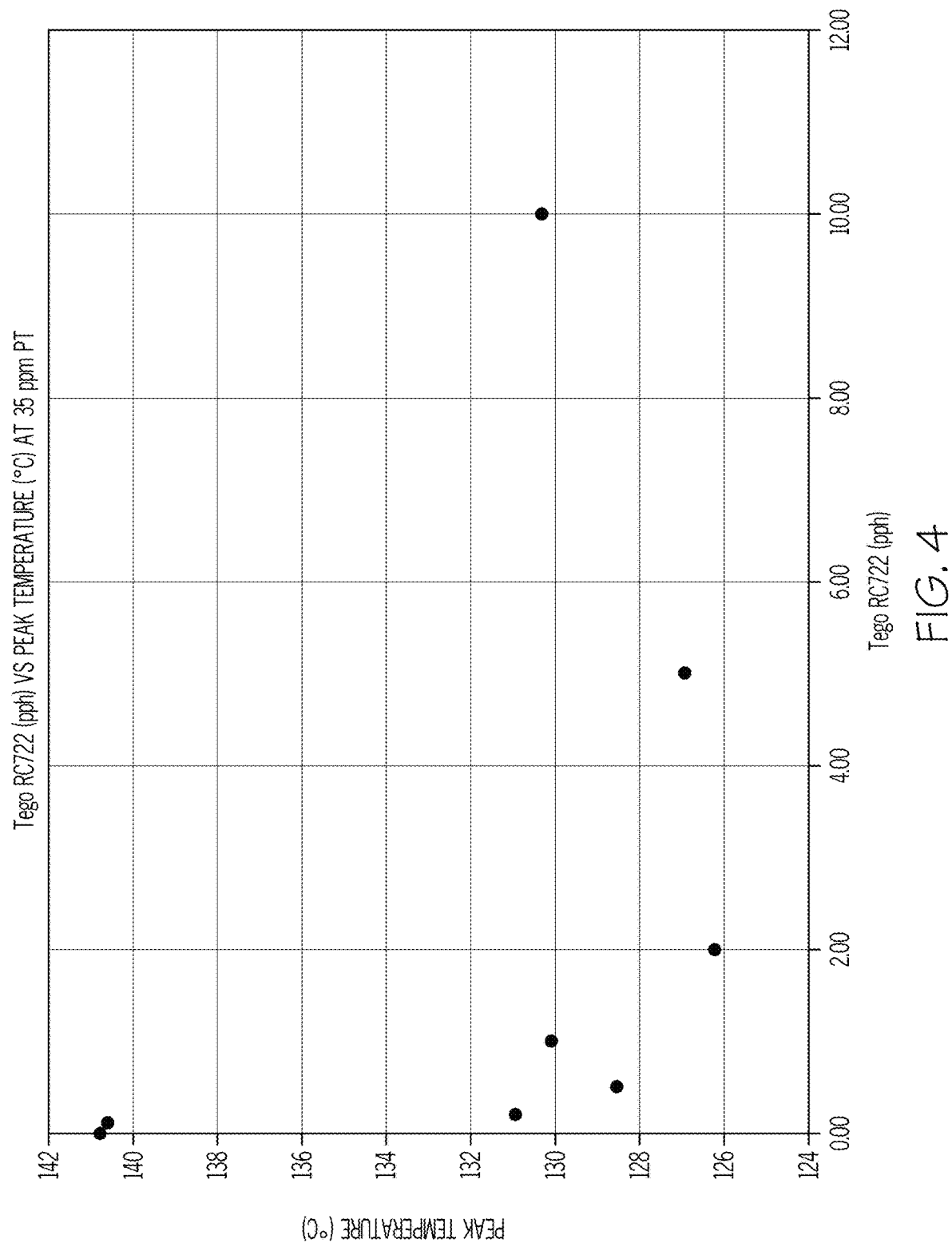
FIG. 4 shows an example relationship between the concentration of the acrylate monomer Tego RC722 in parts per hundred (pph) and the peak cure temperature in degrees Celsius (° C.) for a silicone base composition containing 35 ppm of platinum catalyst.

As demonstrated by the reduced peak cure temperatures shown in Tables 10 and 11, the acrylate-containing compositions exhibited accelerated cures (e.g., reduced peak temperatures) when compared to the acrylate-free control composition. The peak cure temperatures in Tables 10 and 11 were plotted against the amounts of acrylate in order to generate FIGS. 3 and 4, respectively. Both FIG. 3 and FIG. 4 show a sharp decrease in peak cure temperature for the compositions containing ODA and Tego RC722 in amounts of about 2 pph or less, for example, when an acrylate cure accelerator is added in an amount of about 0.2 to about 2 pph or wt %. The addition of more than about 2 pph of the acrylate cure accelerator did not reduce the temperature as dramatically but was nevertheless effective. Accordingly, it can be concluded that the addition of about 2 pph or less (e.g., about 0.1 or about 0.2 to about 2 pph) of acrylate monomer as a cure accelerator to a silicone base composition generates a pronounced decrease in peak cure temperature, and that this range is generally the most effective for all acrylate monomers irrespective of the composition's platinum concentration, which can be about 60 ppm or less, about 50 ppm or less, about 40 ppm or less, or about 35 ppm or less.

The above studies focused on the addition on a single type of additive to a silicone base composition. Accordingly, a study was performed by adding two additives to a silicone base composition, namely one acrylate monomer and one O-vinyl compound. The 10 ppm, 20 ppm, and 30 ppm silicone base compositions set forth in Table 8, above, were used for this study. One acrylate monomer (TMPTA) and one O-vinyl compound (BDVE) were added on top of the silicone base compositions in the amounts indicated in Table 12. Upon the addition of the TMPTA and BDVE, the compositions were cured, and the peak temperatures, peak heights, peak widths, peak areas, and temperatures at 95% cure were measured via DSC as previously described. The results are set forth in Table 12.

TABLE 12

Cure Study Using One Acrylate Additive (TMPTA) and One Vinyl Ether Additive (BDVE) With Silicone Base Compositions Containing Varying Pt Levels

| Pt (ppm) | TMPTA (pph) | BDVE (pph) | Peak Temp (° C.) | Peak Height (W/g) | Peak Width (° C.) | Peak Area (J/g) | Temp (° C.) 95% Cure | ΔT (T95% – Peak T) |
|---|---|---|---|---|---|---|---|---|
| 10 (control) | 0 | 0 | 140.9 | 0.8102 | 2.49 | 28.34 | 146.0 | 5.13 |
| 10 | 0 | 0.5 | 141.8 | 1.198 | 3.19 | 35.03 | 148.9 | 7.12 |
| 10 | 0.25 | 0.25 | 129.0 | 1.02 | 3.98 | 36.58 | 137.4 | 8.44 |
| 10 | 0.5 | 0 | 130.0 | 1.176 | 3.96 | 39.52 | 137.8 | 7.77 |
| 10 | 0.5 | 0.5 | 127.3 | 1.184 | 4.18 | 43.04 | 138.8 | 11.47 |
| 20 | 0 | 0.25 | 130.2 | 1.843 | 2.73 | 38.97 | 136.5 | 6.29 |
| 20 | 0.25 | 0 | 116.7 | 1.234 | 3.42 | 34.13 | 122.9 | 6.24 |
| 20 | 0.25 | 0.25 | 116.5 | 1.272 | 3.68 | 38.75 | 123.9 | 7.32 |
| 20 | 0.25 | 0.25 | 115.8 | 1.268 | 3.68 | 39.1 | 123.5 | 7.65 |
| 20 | 0.25 | 0.25 | 116.4 | 1.355 | 3.56 | 39.65 | 123.9 | 7.48 |
| 20 | 0.25 | 0.25 | 117.1 | 1.16 | 3.61 | 38.28 | 125.0 | 7.90 |
| 20 | 0.25 | 0.25 | 118 | 1.257 | 3.67 | 39.46 | 124.8 | 6.86 |
| 20 | 0.25 | 0.25 | 115.6 | 1.375 | 3.5 | 39.51 | 123.1 | 7.48 |
| 20 | 0.25 | 0.5 | 115.6 | 1.28 | 3.97 | 42.28 | 123.7 | 8.12 |
| 20 | 0.5 | 0.25 | 115.4 | 0.769 | 4.88 | 39.82 | 127.3 | 11.94 |

TABLE 12-continued

Cure Study Using One Acrylate Additive (TMPTA) and One Vinyl Ether Additive
(BDVE) With Silicone Base Compositions Containing Varying Pt Levels

| Pt (ppm) | TMPTA (pph) | BDVE (pph) | Peak Temp (° C.) | Peak Height (W/g) | Peak Width (° C.) | Peak Area (J/g) | Temp (° C.) 95% Cure | ΔT (T95% − Peak T) |
|---|---|---|---|---|---|---|---|---|
| 30 (control) | 0 | 0 | 126.9 | 1.543 | 2.56 | 34.43 | 133.2 | 6.34 |
| 30 | 0 | 0.5 | 123.5 | 1.412 | 2.31 | 30.12 | 127.5 | 4.05 |
| 30 | 0.25 | 0.25 | 109.3 | 1.294 | 3.71 | 40.07 | 116.6 | 7.30 |
| 30 | 0.5 | 0 | 110.9 | 1.267 | 3.79 | 40.7 | 118.9 | 8.01 |
| 30 | 0.5 | 0.5 | 107.8 | 0.9201 | 4.54 | 40.77 | 119.2 | 11.39 |

Table 12 shows that the combination of an acrylate monomer (TMPTA) and an O-vinyl compound (BDVE) resulted in significantly reduced peak cure temperatures when compared to the additive-free control compositions, the acrylate monomer-containing composition, and the o-vinyl compound-containing composition. Because the compositions containing the acrylate monomer/O-vinyl compound bend reduced the peak cure temperature the most, it can be concluded that the acrylate monomer/O-vinyl compound blend is an effective cure accelerator combination.

Similarly, compositions containing both an acrylate monomer and an O-vinyl compound exhibited the largest peak areas while maintaining peak height and reaction rate, which indicates that a greater portion of those compositions were cured (e.g., cure enhancement) than the additive-free compositions, the acrylate monomer-containing compositions, and the O-vinyl compound-containing compositions. Accordingly, it can be concluded that the acrylate monomer/O-vinyl compound blend is also an effective cure enhancer.

In order to evaluate the potential effect of acrylate monomer on the elasticity of a cured silicone base composition, a study was performed via rheometer using the silicone base composition containing 10 ppm of platinum catalyst set forth above in Table 8. 0.25 pph of additives, as set forth below in Table 13, were added to the base composition. Once the additive was incorporated, the composition was cured as previously described and the first derivative maximum temperature, first derivative maximum reaction rate, second derivative minimum temperature, and G' at the second derivative minimum temperature values were obtained using a rheometer. The results are reflected below in Table 13.

As evidenced by the G' at the second derivative minimum temperature values for the acrylate monomer-containing compositions and the acrylate-free control composition in Table 13, the acrylate monomer generally does not appear to significantly affect the elasticity of the cured composition.

Finally, in order to evaluate the effects of acrylate and O-vinyl compounds on the elasticity of a cured composition, a cure study was performed via rheometer on silicone base compositions containing no additives (control), only acrylate monomer, and a blend of acrylate monomer and o-vinyl compound. 0.25 pph of the acrylate monomer TMPTA was added on top of a 30 ppm platinum catalyst silicone base composition as set forth in Table 8. Similarly, 0.25 pph TMPTA and 0.2 pph of the o-vinyl ether, BDVE, were added on top of another 30 ppm platinum catalyst silicone base composition as set forth in Table 8. These two samples, in addition to one sample containing no additive (control), were subjected to curing as previously described. The storage modulus values were measured via rheometer as the temperature was continuously increased by 10° C./min. The data obtained is reflected below in Table 14 and in FIG. 5.

TABLE 13

Cure Study Using 10 ppm Pt catalyst, 0% CRA Silicone Base
Composition and 0.25 pph of Additive in Rheometer

| Additive | First Derivative Max. Temp. (° C.) | First Derivative Max. Reaction Rate (Pa/° C.) | Second Derivative Min. Temp.(° C.) | G' at the second derivative min. temp. (Pa) |
|---|---|---|---|---|
| None (Control) | 131.7 | 115938 | 139.8 | 1485930 |
| Stearyl methacrylate | 133.0 | 116936 | 138.1 | 1320490 |
| 2(2-Ethoxyethoxy)-ethyl acrylate | 125.2 | 110245 | 130.5 | 1298830 |
| ODA-N | 128.6 | 102195 | 133.2 | 1442760 |
| Propoxylated (3 mol) trimethylolpropane triacrylate (TMPTA) | 121.8 | 111283 | 130.0 | 1417390 |
| TMPTA | 126.0 | 119646 | 130.1 | 1431930 |
| Polyethylene glycol (200) diacrylate | 123.5 | 110998 | 131.1 | 1531190 |

TABLE 14

Cure Study of 30 ppm Pt, 0% CRA Silicone Base Compositions with No Additives,
Acrylate Monomer, and Acrylate Monomer/O-Vinyl Compound in Rheometer

| 30 ppm Pt, no additive (control) | | 30 ppm Pt 0.25 pph TMPTA | | 30 ppm Pt 0.25 pph TMPTA, 0.2 pph BDVE | |
|---|---|---|---|---|---|
| Temperature (° C.) | Storage modulus (G') (Pa) | Temperature (° C.) | Storage modulus (G') (Pa) | Temperature (° C.) | Storage modulus (G') (Pa) |
| 70.6 | −1.77846 | 70.6 | −3.84436 | 70.7 | 1.2739 |
| 72.3 | 1.30734 | 72.2 | −1.35743 | 72.3 | −1.73367 |
| 73.8 | 0.586421 | 73.8 | 3.08266 | 73.8 | 1.5806 |
| 75.4 | 0.45179 | 75.4 | −2.78624 | 75.5 | −0.871981 |
| 76.9 | −3.50808 | 76.9 | 1.20316 | 77.0 | −4.93409 |
| 78.5 | 1.20395 | 78.5 | −1.85207 | 78.6 | 1.41169 |
| 80.1 | 0.772929 | 80.1 | −2.29559 | 80.2 | 2.25611 |
| 81.6 | −0.542157 | 81.6 | 2.49473 | 81.7 | 1.02462 |
| 83.3 | −2.03659 | 83.3 | −0.711701 | 83.3 | −1.88941 |
| 84.8 | 2.2238 | 84.8 | −1.34018 | 84.9 | −0.978462 |
| 86.4 | 1.36033 | 86.3 | −1.87138 | 86.5 | 3.93045 |
| 87.9 | 4.51172 | 87.9 | 1.23201 | 88.1 | −0.43879 |
| 89.5 | 10.9115 | 89.5 | 1.81252 | 89.6 | 0.697698 |
| 91.1 | 37.7744 | 91.1 | 2.11179 | 91.2 | −1.13305 |
| 92.7 | 90.4595 | 92.7 | 2.45116 | 92.7 | −1.99146 |
| 94.3 | 175.694 | 94.3 | 41.7441 | 94.3 | −2.37431 |
| 96.3 | 451.734 | 96.5 | 761.26 | 96.3 | 0.5568 |
| 98.4 | 904.776 | 98.2 | 3335.71 | 97.9 | 26.9072 |
| 100.7 | 1651.19 | 100.1 | 13297.8 | 104.8 | 263655 |
| 102.4 | 2389.19 | 101.9 | 51220.8 | 107.1 | 545407 |
| 103.9 | 3436.19 | 105.4 | 257922 | 110.1 | 999929 |
| 106.4 | 26777.3 | 109.3 | 810975 | 112.2 | 1331950 |
| 108.5 | 60594.1 | 111.4 | 1103820 | 114.9 | 1562680 |
| 110.4 | 94585.2 | 113.5 | 1355620 | 117.3 | 1614690 |
| 113.1 | 200071 | 116.0 | 1454660 | 119.5 | 1643060 |
| 115.6 | 301467 | 118.1 | 1484570 | 121.8 | 1668450 |
| 118.0 | 573494 | 120.7 | 1510770 | 124.3 | 1693650 |
| 120.9 | 1062510 | 123.2 | 1533160 | 126.9 | 1718610 |
| 123.5 | 1314750 | 125.6 | 1554890 | 129.2 | 1740470 |
| 126.2 | 1454020 | 128.0 | 1575920 | 131.7 | 1764710 |
| 128.5 | 1497610 | 130.6 | 1597330 | 133.9 | 1785790 |
| 130.9 | 1518300 | 133.1 | 1618300 | 136.4 | 1809210 |
| 133.3 | 1537480 | 136.6 | 1651960 | 138.7 | 1830810 |
| 135.6 | 1555480 | 138.7 | 1666210 | 141.1 | 1852660 |
| 137.8 | 1573300 | 141.1 | 1686390 | 143.5 | 1876040 |
| 140.2 | 1592540 | 143.5 | 1707460 | 145.9 | 1898340 |
| 142.5 | 1610460 | 145.9 | 1726250 | 148.4 | 1921200 |
| 144.9 | 1629930 | 148.2 | 1746230 | 150.7 | 1942910 |
| 147.5 | 1649650 | 150.5 | 1766540 | 153.0 | 1963840 |
| 149.9 | 1668920 | 153.0 | 1787340 | 155.1 | 1984900 |
| 152.4 | 1688180 | 155.5 | 1807790 | 157.7 | 2008230 |
| 154.8 | 1707430 | 157.9 | 1828680 | 160.1 | 2030600 |
| 157.4 | 1727390 | 160.3 | 1848930 | 162.5 | 2052880 |
| 159.7 | 1745840 | 162.7 | 1869140 | 164.9 | 2075530 |
| 162.1 | 1764950 | 165.2 | 1889760 | 167.3 | 2098330 |
| 164.7 | 1785300 | 167.5 | 1909260 | 169.6 | 2119440 |
| 167.1 | 1804290 | 169.9 | 1930290 | 172.0 | 2142180 |
| 169.6 | 1824060 | 172.4 | 1950870 | 174.4 | 2164740 |
| 171.9 | 1842990 | 174.7 | 1970580 | 176.6 | 2186170 |
| 174.5 | 1863090 | 177.1 | 1990210 | 178.9 | 2207400 |
| 177.1 | 1883960 | 179.6 | 2012180 | 180.5 | 2220620 |
| 179.5 | 1903480 | 180.5 | 2012080 | | |
| 180.5 | 1908060 | | | | |

Figure 5:
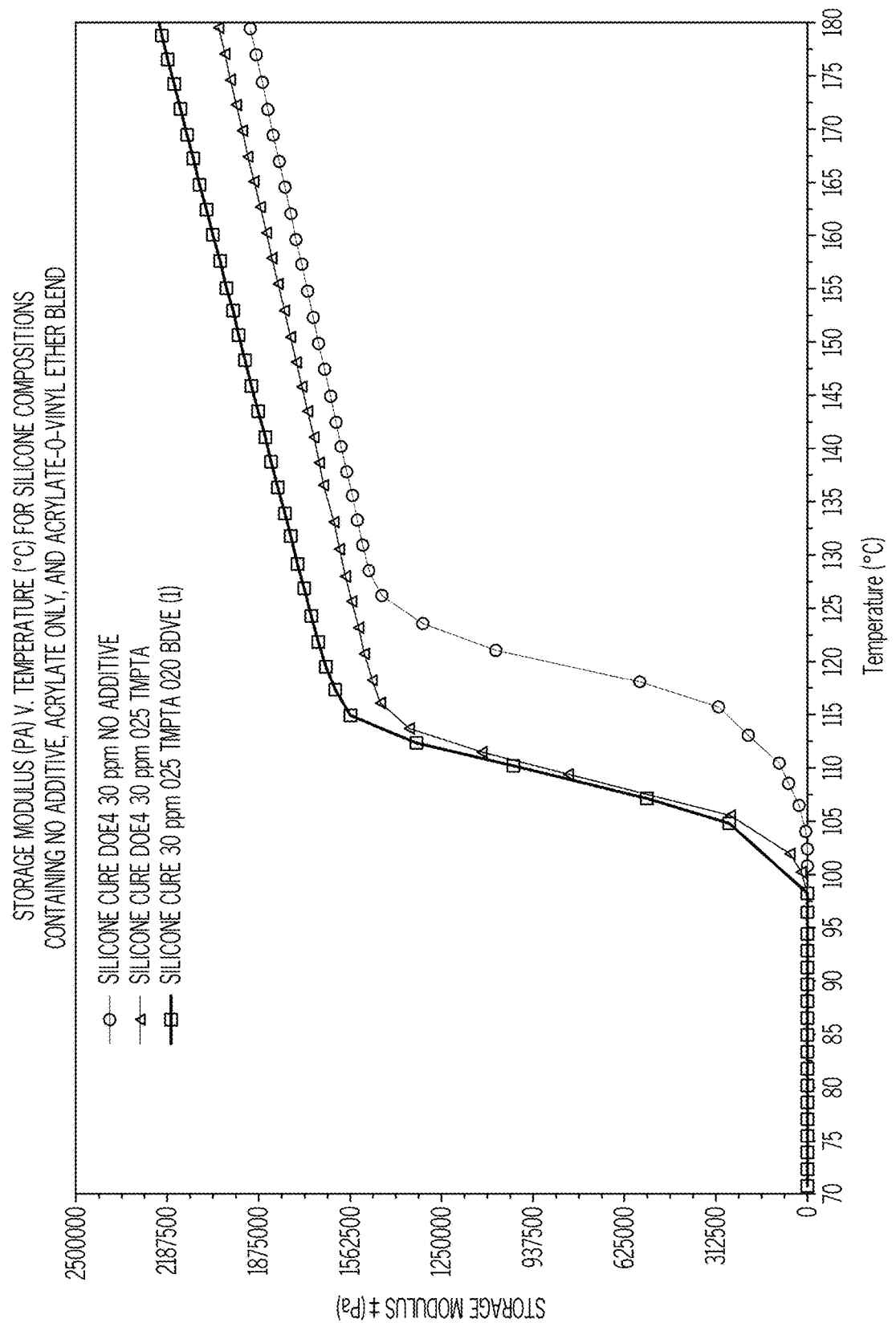
FIG. 5 shows an example relationship between storage modulus in Pascals (Pa) and the cure temperature in degrees Celsius (° C.) for silicone base compositions containing no additives, an acrylate monomer (TMPTA), and an acrylate monomer/O-vinyl compound blend (TMPTA/BDVE).

As shown in FIG. 5, the TMPTA-only and TMPTA/BDVE-containing compositions attained peak cure temperatures at approximately 10 and 13 degrees Celsius lower, respectively, than the additive-free composition. This indicates that the TMPTA-only and TMPTA/BDVE-containing compositions exhibited an accelerated rate of cure, with the TMPTA/BDVE-containing composition curing slightly faster. Furthermore, the TMPTA-only and TMPTA/BDVE-containing compositions also achieved higher storage moduli values than the additive-free composition, with the TMPTA/BDVE-containing composition exhibited the highest storage moduli value. Thus, it is evidenced that the use of acrylate monomers, O-vinyl compounds, or blends thereof does not negatively impact the elasticity of a cured silicone base composition.

In order to exhibit applying the compositions of the present disclosure on a flexible liner and forming a release liner, in addition to forming an adhesive article, compositions were formed from the following components listed in Tables 15-19.

TABLE 15

Composition 1

| Component | Wt. % |
| --- | --- |
| DEH 915 | 80.26 |
| CRA 17 | 9.6 |
| V 90 | 7.17 |
| HSPC | 2.77 |
| Cure accelerator | 0.2 |

Dehesive 915 (DEH 915), the silicone base polymer, is a short-chain, linear, di-functional, vinyl-terminated silicone polymer provided by Wacker Chemicals, was used for the silicone base polymer. A V90, a silicone crosslinker provided by Wacker Chemical, was added and mixed until uniform. The silicone crosslinker is an organo-hydrogen polysiloxane having at least an average of two or more silicon atom-bound hydrogen atoms (Si—H groups) within one molecule: an amount such that the number of moles of the Si—H groups is equal to 1 to 5 times that of the number of moles of the alkenyl groups within the silicone base polymer. A silicone release modifier resin (e.g., a controlled release agent), CRA 17, was added to the silicone base polymer and agitated until uniform. The platinum solution, Wacker HSPC, was used to bring the ppm of platinum to 30 ppm in terms of platinum atomic mass. Lastly, 0.2 parts by mass of 3-Acryloxypropyl Trimethoxysilane as an acrylate cure accelerator is added to the mixture and mixed for 10 minutes.

As a first control composition, the components listed in Table 16 were combined.

TABLE 16

Control Composition 1

| Component | Wt. % |
| --- | --- |
| DEH 915 | 77.54 |
| CRA 17 | 9.29 |
| V 90 | 7.1 |
| HSPC | 5.57 |
| Cure accelerator | 0.5 |

Dehesive 915 (DEH 915), the silicone base polymer, is a short-chain, linear, di-functional, vinyl-terminated silicone polymer provided by Wacker Chemicals, was used for the silicone base polymer. A V90, a silicone crosslinker provided by Wacker Chemical, was added and mixed until uniform. A silicone release modifier resin (e.g., a controlled release agent), CRA 17, was added to the silicone base polymer and agitated until uniform. The platinum solution, Wacker HSPC, was used to bring the ppm of platinum up to 60 ppm in terms of platinum atomic mass. Lastly, 0.5 parts by mass of Vinyltrimethoxysilane as a cure accelerator is added to the mixture and mixed for 10 minutes.

As a second control composition, the components listed in Table 17 were combined.

TABLE 17

Control Composition 2

| Component | Wt. % |
| --- | --- |
| DEH 915 | 77.54 |
| CRA 17 | 9.29 |
| V 90 | 7.1 |

TABLE 17-continued

Control Composition 2

| Component | Wt. % |
| --- | --- |
| HSPC | 5.57 |
| Cure accelerator | 0.5 |

Dehesive 915 (DEH 915), the silicone base polymer, is a short-chain, linear, di-functional, vinyl-terminated silicone polymer provided by Wacker Chemicals, was used for the silicone base polymer. A V90, a silicone crosslinker provided by Wacker Chemical, was added and mixed until uniform. A silicone release modifier resin (e.g., a controlled release agent), CRA 17, was added to the silicone base polymer and agitated until uniform. The platinum solution, Wacker HSPC, was used to bring the ppm of platinum up to 15 ppm in terms of platinum atomic mass. Lastly, 0.5 parts by mass of Vinyltrimethoxysilane as a cure accelerator is added to the mixture and mixed for 10 minutes.

As another example composition, excluding a controlled release agent, the components listed in Table 18 were combined.

TABLE 18

Composition 2

| Component | Wt. % |
| --- | --- |
| SL 161 | 93.16 |
| 7488 | 5.23 |
| SL 3000 | 1.37 |
| Cure accelerator | 0.25 |

Dow silicone SL 161 was used for the silicone base polymer. A 7488, a silicone crosslinker provided by Dow, was added and mixed until uniform. The platinum solution, SL 3000, was used to bring the ppm of platinum to 15 ppm in terms of platinum atomic mass. Lastly, 0.25 parts by mass of TMPTA, trimethylolpropane triacrylate, as a cure accelerator is added to the mixture and mixed for 10 minutes.

As another example composition, excluding a controlled release agent, the components listed in Table 19 were combined.

TABLE 19

Composition 3

| Component | Wt. % |
| --- | --- |
| SL 161 | 93.16 |
| 7488 | 5.23 |
| SL 3000 | 1.37 |
| Cure accelerator | 0.25 |

Dow silicone SL 161 was used for the silicone base polymer. A 7488, a silicone crosslinker provided by Dow, was added and mixed until uniform. The platinum solution, SL 3000, was used to bring the ppm of platinum to 15 ppm in terms of platinum atomic mass. Lastly, 0.25 parts by mass of propoxylated (3 mol) TMPTA, trimethylolpropane triacrylate, as a cure accelerator is added to the mixture and mixed for 10 minutes.

As another example composition, excluding a controlled release agent, the components listed in Table 20 were combined.

TABLE 20

Composition 4

| Component | Wt. % |
|---|---|
| SL 161 | 93.16 |
| 7488 | 5.23 |
| SL 3000 | 1.37 |
| Cure accelerator | 0.25 |

Dow silicone SL 161 was used for the silicone base polymer. A 7488, a silicone crosslinker provided by Dow, was added and mixed until uniform. The platinum solution, SL 3000, was used to bring the ppm of platinum to 15 ppm in terms of platinum atomic mass. Lastly, 0.25 parts by mass of polyethylene glycol 200 diacrylate (PEG200DA) as a cure accelerator is added to the mixture and mixed for 10 minutes.

As another example composition, excluding a controlled release agent, the components listed in Table 21 were combined.

TABLE 21

Composition 5

| Component | Wt. % |
|---|---|
| SL 161 | 93.11 |
| 7488 | 5.22 |
| SL 3000 | 1.37 |
| Cure accelerator | 0.25 |
| Dodecyl Vinyl Ether | 0.15 |

Dow silicone SL 161 was used for the silicone base polymer. A 7488, a silicone crosslinker provided by Dow, was added and mixed until uniform. The platinum solution, SL 3000, was used to bring the ppm of platinum to 15 ppm in terms of platinum atomic mass. 0.25 parts by mass of 3-Acryloxypropyl Trimethoxysilane as an acrylate cure accelerator and 0.05 parts by mass of Dodecyl Vinyl Ether are added to the mixture and mixed for 10 minutes.

The control compositions of Tables 16 and 17, and compositions 1-5 as noted in Tables 15 and 18-21 were used to coat a flexible liner with a release layer and cured to form a release liner.

200 lbs of the control composition and compositions 1-4 were prepared and transferred into a container. The composition solution in the container was coated as a release layer on kraft paper using a 5-roll silicone coater. The coated paper was passed through three 20-foot ovens with the temperature of the ramping from 265° F. up to 330° F. at a rate of 1850 ft./min. This creates an exit web temperature of 310° F. with about 2 seconds of oven dwell time for the purpose of curing the composition of the release layer to for a release liner. The cured, coated paper was remoisturized with two steam foils to bring the paper's moisture levels back to pre-oven levels.

The release liners formed with each composition coating were used to form an adhesive article. Using a slot die coater, the release liner was coated with a rubber-based hot melt adhesive material. A thermal transfer paper facestock was then laminated to the adhesive-coated surface of the construct to form an adhesive article.

In other examples, 100 lbs. of the control composition and compositions 1-5 were prepared and placed into a container. The composition solution in the container was coated as a release layer on kraft paper using a 3-roll gravure silicone coating head. The coated paper was passed through three 20-foot ovens at two test speeds of 750 ft/min (for the control composition and compositions 1, 3 and 4) and 1,000 ft/min (for the control composition and compositions 1-5). The temperature of the coated paper after the passing through the ovens was 290° F. with a 4.8 seconds and 3.6 seconds of oven dwell time for test speeds 750 ft/min and 1,000 ft/min, respectively, for the purpose of curing the composition of the release layer to for a release liner. The release liners formed with each composition coating were used to form an adhesive article. The release layer side of the release liner was coated with an all-temp acrylic emulsion adhesive and dried in additional oven A thermal transfer paper facestock was then laminated to the adhesive-coated surface of the construct to form an adhesive article.

In order to test for silicone extractables, samples of each of the release liners containing the control composition and compositions 1-5 were delaminated from the adhesive and facestock and the residual silicone coat weight remaining on the paper facestock was measured using an Oxford LabX 3500 device. The known coating weight samples of the release liners were placed in 30 ml of MIBK or Toluene and agitated for 30 minutes. The known coat weight samples of release liners were dried in a fume hood and coat weight of each sample was remeasured. The difference between original coating weight of the release liner and the delaminated samples was compared to determine the amount of composition from the coating of the release liner was transferred to the paper facestock of the adhesive article. Also, the MIBK or Toluene solution was tested for atomic absorption of silicone.

In order to test for 32 fpm release force, 16"×2" on the full laminate is cut. Sample is held in place on a I Mass Slip/Peel Tester TL-2300 and delaminated at 32 fpm. This same procedure is used to measure 950 fpm release force but a IMASS ZPE-1100W machine is used in lieu on the I Mass Slip/Peel Tester TL-2300

For measuring silicone anchorage. A sample is measure for silicone coat weight using an Oxford LabX 3500, this sample is placed under 10 lbs. of force and rub along a felt surface for 2 ft. at a rate of 24 fpm. The sample is then remeasured for coat weight and the ratio of silicone coat weight before and after abrasion is reported as the silicone anchorage percentage.

The measured test data for the adhesive articles containing the release layer formed by the Control Composition 1 and Compositions 1-4 in the oven with a speed of 1850 ft./min is shown below in Tables 22 and 23.

TABLE 22

| Composition | Platinum Concentration (ppm) | Silicon Coat Weight (Lbs/ream) | 7-day, 32 fpm, Release Force (g/in.$^2$) | 14-day, 32 fpm, Release Force (g/in.$^2$) | 28-day, 32 fpm, Release Force (g/in.$^2$) |
|---|---|---|---|---|---|
| Control Composition 1 | 60 | 1.02 | 14.25 | 16.0 | 18.0 |
| Composition 1 | 30 | 1.01 | 14.25 | 20.63 | 21.63 |
| Composition 2 | 15 | 1.11 | 12 | 13 | 14.88 |

TABLE 22-continued

| Composition | Platinum Concentration (ppm) | Silicon Coat Weight (Lbs/ream) | 7-day, 32 fpm, Release Force (g/in.$^2$) | 14-day, 32 fpm, Release Force (g/in.$^2$) | 28-day, 32 fpm, Release Force (g/in.$^2$) |
|---|---|---|---|---|---|
| Composition 3 | 15 | 1.12 | 11 | 12.5 | 12.38 |
| Composition 4 | 15 | 1.13 | 9.5 | 11.5 | 11.13 |

TABLE 23

| Composition | 7-day, 950 fpm, Release Force (g/in.$^2$) | 14-day, 950 fpm, Release Force (g/in.$^2$) | 28-day, 950 fpm, Release Force (g/in.$^2$) | % Silicone Extractables | Silicone Anchorage (% Retention) |
|---|---|---|---|---|---|
| Control Composition 1 | 80.25 | 95.63 | 75.0 | 3.3 | 57.52 |
| Composition 1 | 83.0 | 119.81 | 85.58 | 6.43 | 69.04 |
| Composition 2 | 167 | 149.5 | 116.88 | 9 | 84 |
| Composition 3 | 174 | 163 | 149.5 | 11 | 73 |
| Composition 4 | 160.5 | 159 | 138.38 | 14 | 65 |

As shown in Tables 22 and 23, Compositions 1-4, with half of the platinum concentration (Composition 1) and a quarter of the platinum concentration (Compositions 2-4) of the Control Composition 1, exhibited comparable, and sometimes improved, adhesion force to the paper facestock. The acrylate additives in Compositions 1-4 required 50 to 75% less catalyst to achieve sufficient adhesion to the paper facestock, which acknowledges an improved savings in catalyst material.

Compositions 1-4 also exhibited an adequate percentage of silicone extractables which indicates that the compositions cured even with a significantly reduced amount of catalyst as compared to Control Composition 1. As shown in Table 23, Compositions 1-4 with 30 ppm or less of catalyst were measured to have 14% or less silicone extractables. The sufficient cure of Compositions 1-4 was further evidenced by all of the compositions having a greater silicone anchorage than Control Composition 1. As shown in Table 23, Compositions 1-4 with 30 ppm or less of catalyst were measured to have a silicone anchorage of 60% or more, or 65% or more.

The measured test data for the adhesive articles containing the release layer formed by the Control Composition 2 and Compositions 1, 3 and 4 in the oven with a speed of 750 ft./min is shown below in Tables 24 and 25.

TABLE 24

| Composition | Platinum Concentration (ppm) | Silicon Coat Weight (Lbs/ream) | Off Coater, 32 fpm, Release Force (g/in.$^2$) | 7-day, 32 fpm, Release Force (g/in.$^2$) | 7-day, 950 fpm, Release Force (g/in.$^2$) |
|---|---|---|---|---|---|
| Control Composition 2 | 15 | 0.96 | — | 20 | 167 |
| Composition 1 | 30 | 0.95 | 10.0 | 21 | 207 |
| Composition 3 | 15 | 1.01 | 16.0 | 26 | 222 |
| Composition 4 | 15 | 1.00 | 12.0 | 22 | 207 |

TABLE 25

| Composition | % Silicone Extractables | Silicone Anchorage (% Retention) |
|---|---|---|
| Control Composition 2 | 20.4 | 70.46 |
| Composition 1 | 12.4 | 83.17 |
| Composition 3 | 5.5 | 89.83 |
| Composition 4 | 6.6 | 87.2 |

As shown in Table 24, Compositions 1 and 3-4 exhibited improved adhesion force over a range of delamination speeds to the paper facestock as compared to Control Composition 2 without an acrylate additive. Thus, the acrylate additive contributes enhanced adhesion force performance without the need for additional catalyst.

Compositions 1 and 3-4 also exhibited an adequate percentage of silicone extractables as compared to Control Composition 2, which indicates that the compositions cured even with a significantly reduced amount of catalyst. Control Composition 2 exhibited reduced cure with a measured silicone extractables of 20.4% as compared to the compositions with acrylate additive and the same or similar catalyst loading. As shown in Table 25, Compositions 1 and 3-4 with 30 ppm or less of catalyst were measured to have 12.4% or less silicone extractables, and Compositions 3 and 4 had 7% or less silicone extractables. Thus, Compositions 1 and 3-4 exhibited improved cure as compared to Control Composition 2 without an acrylate additive. The sufficient cure of Compositions 1 and 3-4 was further evidenced by all of the compositions having a greater silicone anchorage than Control Composition 2. As shown in Table 25, Compositions 1 and 3-4 with 30 ppm or less of catalyst were measured to have a silicone anchorage of 70% or more, or 80% or more.

The measured test data for the adhesive articles containing the release layer formed by the Control Composition 2 and Compositions 1-5 in the oven with a speed of 1000 ft./min is shown below in Tables 26 and 27.

TABLE 26

| Composition | Platinum Concentration (ppm) | Silicon Coat Weight (Lbs/ream) | Off Coater, 32 fpm, Release Force (g/in.$^2$) | 7-day, 32 fpm, Release Force (g/in.$^2$) | 7-day, 950 fpm, Release Force (g/in.$^2$) |
|---|---|---|---|---|---|
| Control Composition 2 | 15 | 0.93 | 15.00 | 29 | 182 |
| Composition 1 | 30 | 0.95 | 17.25 | 17 | 212 |
| Composition 2 | 15 | 0.98 | 12.25 | 24 | 205 |
| Composition 3 | 15 | 1.01 | 15.50 | 46 | 312 |
| Composition 4 | 15 | 1.00 | 11.75 | 25 | 215 |
| Composition 5 | 15 | 1.01 | 13.50 | 22 | 200 |

TABLE 27

| Composition | % Silicone Extractables | Silicone Anchorage (% Retention) |
|---|---|---|
| Control Composition 2 | 41.6 | 50.04 |
| Composition 1 | 28.6 | 61.27 |
| Composition 2 | 13 | 72.13 |
| Composition 3 | 13 | 71.04 |
| Composition 4 | 14.8 | 64.03 |
| Composition 5 | 23 | 57.53 |

As shown in Table 26, Compositions 1-5 exhibited either comparable or improved adhesion force over a range of delamination speeds to the paper facestock as compared to Control Composition 2 without an acrylate additive. Thus, the acrylate additive contributes to provide acceptable adhesion or enhanced adhesion force performance without the need for additional catalyst.

Compositions 1-5 also exhibited an adequate percentage of silicone extractables as compared to Control Composition 2, which indicates that the compositions cured even with a significantly reduced amount of catalyst. Control Composition 2 exhibited a significantly reduced and poor cure with a measured silicone extractables of 41.6%. As shown in Table 27, Compositions 2-4 with 15 ppm of platinum catalyst were measured to have 14.8% or less silicone extractables, and Compositions 2 and 3 had 13% or less silicone extractables. Thus, Compositions 2-4 exhibited improved cure as compared to Control Composition 2 without an acrylate additive. The sufficient cure of Compositions 1-5 was further evidenced by all of the compositions having a greater silicone anchorage than Control Composition 2. As shown in Table 27, Compositions 2 and 3 with 15 ppm of platinum catalyst were measured to have a silicone anchorage of 70% or more.

What is claimed is:

1. An adhesive article comprising: a) a substrate; b) an adhesive disposed on the substrate; c) a release liner of comprising a first surface; d) a cured form of a composition disposed on a portion of the first surface of the liner, the cured form of a composition comprising:
   i. a silicone base polymer;
   ii. an acrylate cure accelerator present in an amount between about 0.05 to about 1 wt. % based on the total weight of the composition;
   iii. a catalyst present in the range of between about 10 ppm to about 40 ppm of the total weight of the composition, wherein after exposing the composition to a temperature in the range of 90° C. to about 120° C. for a time period in the range of about 2 seconds to about 8 seconds, the composition is cured 95% or more to form the cured form of the composition, wherein the cured composition of the release liner is in contact with the adhesive.

2. The adhesive article of claim 1, wherein the silicone base polymer is a vinyl functional silicone base polymer.

3. The adhesive article of claim 1, wherein the silicone base polymer is present from between about 50 wt. % to about 95 wt. % of the total weight of the composition.

4. The adhesive article of claim 1, further comprising an O-vinyl ether compound.

5. The adhesive article of claim 4, wherein the O-vinyl ether compound is selected from the group consisting of 1,4 cyclohexanedimethanol divinyl ether, butanedioldivinylether, and dodecylvinylether.

6. The adhesive article of claim 4, wherein the O-vinyl ether compound is present from between about 0.01 wt. % to about 10 wt. % of the total weight of the composition.

7. The adhesive article of claim 1, wherein the acrylate cure accelerator is selected from the group consisting of a mono-, di-, tri-, and multifunctional acrylate.

8. The adhesive article of claim 7, wherein the acrylate cure accelerator is selected from the group consisting of hexane diol diacrylate, tricyclodecanediol diacrylate, isobornyl acrylate, octyl/decyl acrylate, silicone diacrylate, silicone hexaacrylate, 3-acryloxypropyl trimethoxysilane, and trimethylolpropane triacrylate.

9. The adhesive article of claim 1, wherein the acrylate cure accelerator is a hydrophilic acrylate monomer.

10. The adhesive article of claim 1, further comprising a crosslinking agent comprising a silicone hydride functional group.

11. The adhesive article of claim 1, further comprising a controlled release agent, the controlled release agent is present in an amount of less than 50 wt. % of the total weight of the composition.

12. The adhesive article of claim 1, wherein the catalyst comprises platinum.

13. The adhesive article of claim 12, wherein the catalyst is present at about 35 ppm or less of the total weight of the composition.

14. The adhesive article of claim 1, wherein the time period for curing the composition is in the range of about 1 second to about 5 seconds and the temperature for curing the composition is in the range of about 100° C. to about 130115° C.

15. The adhesive article of claim 1, wherein the modulus (G') of the composition after curing is $1\times10^6$ Pascals or more measured at a temperature of about 120° C. and wherein the loss factor (tan.delta.) of the composition after curing is less than 0.01 measured at a temperature of about 120° C.

16. The adhesive article of claim 1, wherein the acrylate cure accelerator is the sole cure accelerator present in the composition.

17. The adhesive article of claim 1, wherein the liner is selected from the group consisting of a polymer film, a plastic film, and a paper liner.

18. The adhesive article of claim 1, wherein the substrate is selected from the group consisting of a polymeric film, paper, and combinations thereof.

19. The adhesive article of claim 1, wherein the adhesive is a pressure sensitive adhesive.

20. The adhesive article of claim 1, wherein the acrylate cure accelerator is a mono-functional acrylate cure accelerator.

* * * * *